(12) United States Patent
Yamamoto et al.

(10) Patent No.: US 11,573,453 B2
(45) Date of Patent: Feb. 7, 2023

(54) LIGHT SOURCE DEVICE

(71) Applicant: Japan Display Inc., Tokyo (JP)

(72) Inventors: Rina Yamamoto, Tokyo (JP); Ken Sugiyama, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 17/449,822

(22) Filed: Oct. 4, 2021

(65) Prior Publication Data

US 2022/0026765 A1  Jan. 27, 2022

Related U.S. Application Data

(63) Continuation of application No. PCT/JP2020/015029, filed on Apr. 1, 2020.

(30) Foreign Application Priority Data

Apr. 12, 2019 (JP) .............................. JP2019-076284

(51) Int. Cl.
*G02F 1/00* (2006.01)
*G02F 1/13357* (2006.01)
*G02F 1/1335* (2006.01)

(52) U.S. Cl.
CPC .................. *G02F 1/133603* (2013.01); *G02F 1/133607* (2021.01)

(58) Field of Classification Search
CPC ......... G02F 1/133603; G02F 1/133607; G02F 1/133608
See application file for complete search history.

(56) References Cited

U.S. PATENT DOCUMENTS

| | | | |
|---|---|---|---|
| 9,817,179 B2* | 11/2017 | Azuma | F21V 7/0066 |
| 2006/0139959 A1* | 6/2006 | Bae | H01J 61/305 |
| | | | 362/615 |
| 2006/0268567 A1 | 11/2006 | Jang et al. | |
| 2010/0208161 A1 | 8/2010 | Sasaki et al. | |
| 2011/0242796 A1 | 10/2011 | Yang et al. | |
| 2014/0368768 A1 | 12/2014 | Sakai | |

(Continued)

FOREIGN PATENT DOCUMENTS

| | | | |
|---|---|---|---|
| JP | 2012-104731 A | 5/2012 | |
| JP | 2017-173785 A | 9/2017 | |

(Continued)

OTHER PUBLICATIONS

International Search Report dated Jun. 16, 2020 in PCT/JP2020/015029 filed on Apr. 1, 2020.

*Primary Examiner* — Gerald J Sufleta, II
(74) *Attorney, Agent, or Firm* — Maier & Maier, PLLC

(57) ABSTRACT

Provided is a light source device including: a housing body; a light source substrate located over and accommodated in the housing body; a plurality of inorganic light-emitting elements over the light source substrate; an optical sheet located over the plurality of inorganic light-emitting elements, accommodated in the housing body, and spaced away from the light source substrate; and at least one spacer accommodated in the housing body and in contact with a bottom surface of the optical sheet. A region of an upper surface of the light source substrate overlapping the plurality of inorganic light-emitting elements does not overlap the at least one spacer.

13 Claims, 20 Drawing Sheets

(56) References Cited

U.S. PATENT DOCUMENTS

| | | | |
|---|---|---|---|
| 2016/0124270 A1* | 5/2016 | Shimizu | G02F 1/133603 362/621 |
| 2019/0025651 A1* | 1/2019 | Sugiyama | G02F 1/133605 |
| 2020/0081296 A1* | 3/2020 | Ma | G02F 1/133603 |

FOREIGN PATENT DOCUMENTS

| | | |
|---|---|---|
| JP | 2018-106971 A | 7/2018 |
| KR | 10-2014-0089058 A | 7/2014 |
| WO | WO 2017/154050 A1 | 9/2017 |

* cited by examiner

LIGHT SOURCE DEVICE

CROSS REFERENCE TO RELATED APPLICATIONS

This application is a Continuation of International Patent Application No. PCT/JP2020/015029, filed on Apr. 1, 2020, which claims priority to Japanese Patent Application No. 2019-076284, filed on Apr. 12, 2019, the disclosures of which are incorporated herein by reference for all purposes as if fully set forth herein.

BACKGROUND OF THE INVENTION

An embodiment of the present invention relates to a light source device and a display device including the light source device.

DESCRIPTION OF THE RELATED ART

Currently, a liquid crystal display device is represented as one of the most widely used display devices. A liquid crystal display device has a light source device (backlight) and a liquid crystal display module arranged over the light source device as fundamental elements. For example, Japanese Patent Applications No. 2013-143240, 2017-173785, and 2012-104731 disclose a display device in which a light source device having a plurality of light-emitting diodes overlaps a liquid crystal display device.

BRIEF SUMMARY OF THE INVENTION

According to an embodiment of the present invention, a light source device is provided, the light source device includes: a housing body; a light source substrate located over and accommodated in the housing body; a plurality of inorganic light-emitting elements over the light source substrate; an optical sheet located over the plurality of inorganic light-emitting elements, accommodated in the housing body, and spaced away from the light source substrate; and at least one spacer accommodated in the housing body and in contact with a bottom surface of the optical sheet, where a region of an upper surface of the light source substrate overlapping the plurality of inorganic light-emitting elements does not overlap the at least one spacer.

According to an embodiment of the present invention, a light source device is provided, the light source device includes: a housing body; a light source substrate located over and accommodated in the housing body; a plurality of inorganic light-emitting elements over the light source substrate; and an optical sheet located over the plurality of inorganic light-emitting elements and accommodated in the housing body, where the optical sheet has a flat portion overlapping the plurality of inorganic light-emitting elements and a pair of side plates sandwiching the flat portion, and the pair of side plates is bent in a direction toward the light source substrate.

According to an embodiment of the present invention, a light source device is provided, the light source device includes: a housing body; a light source substrate located over and accommodated in the housing body; a plurality of inorganic light-emitting elements over the light source substrate; and an optical sheet located over the plurality of inorganic light-emitting elements and accommodated in the housing body, where the optical sheet has a recessed portion overlapping the plurality of inorganic light-emitting elements and a side plate surrounding the recessed portion.

According to an embodiment of the present invention, a display device including a light source device and a liquid crystal display module over the light source device is provided, the display device includes: a housing body; a light source substrate located over and accommodated in the housing body; a plurality of inorganic light-emitting elements over the light source substrate; an optical sheet located over the plurality of inorganic light-emitting elements, accommodated in the housing body, and spaced away from the light source substrate; and a spacer accommodated in the housing body and in contact with a bottom surface of the optical sheet, where a region of an upper surface of the light source substrate overlapping the plurality of inorganic light-emitting elements does not overlap the spacer.

According to an embodiment of the present invention, a display device including a light source device and a liquid crystal display module over the light source device is provided, the display device includes: a housing body; a light source substrate located over and accommodated in the housing body; a plurality of inorganic light-emitting elements over the light source substrate; and an optical sheet located over the plurality of inorganic light-emitting elements and accommodated in the housing body, where the optical sheet has a flat portion overlapping the plurality of inorganic light-emitting elements and a pair of side plates sandwiching the flat portion, and the pair of side plates is bent in a direction toward the light source substrate.

According to an embodiment of the present invention, a display device including a light source device and a liquid crystal display module over the light source device is provided, the display device includes: a housing body; a light source substrate located over and accommodated in the housing body; a plurality of inorganic light-emitting elements over the light source substrate; and an optical sheet located over the plurality of inorganic light-emitting elements and accommodated in the housing body, where the optical sheet has a recessed portion overlapping the plurality of inorganic light-emitting elements and a side plate surrounding the recessed portion.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, the expression "a structure is exposed from another structure" means a mode in which a part of the structure is not covered by the other structure and includes a mode where the part uncovered by the other structure is further covered by another structure.

In the specification and the claims, integration of a plurality of elements means that the plurality of elements is formed of one member although they are different in thickness, shape, direction, or the like from one another. Thus, the integrated plurality of elements includes the same material and has the same composition as each other.

First Embodiment

In the present embodiment, a light source device 110 and a display device 100 including the light source device 110 according to an embodiment of the present invention are explained.

1. Outline Structure

Figure 1:
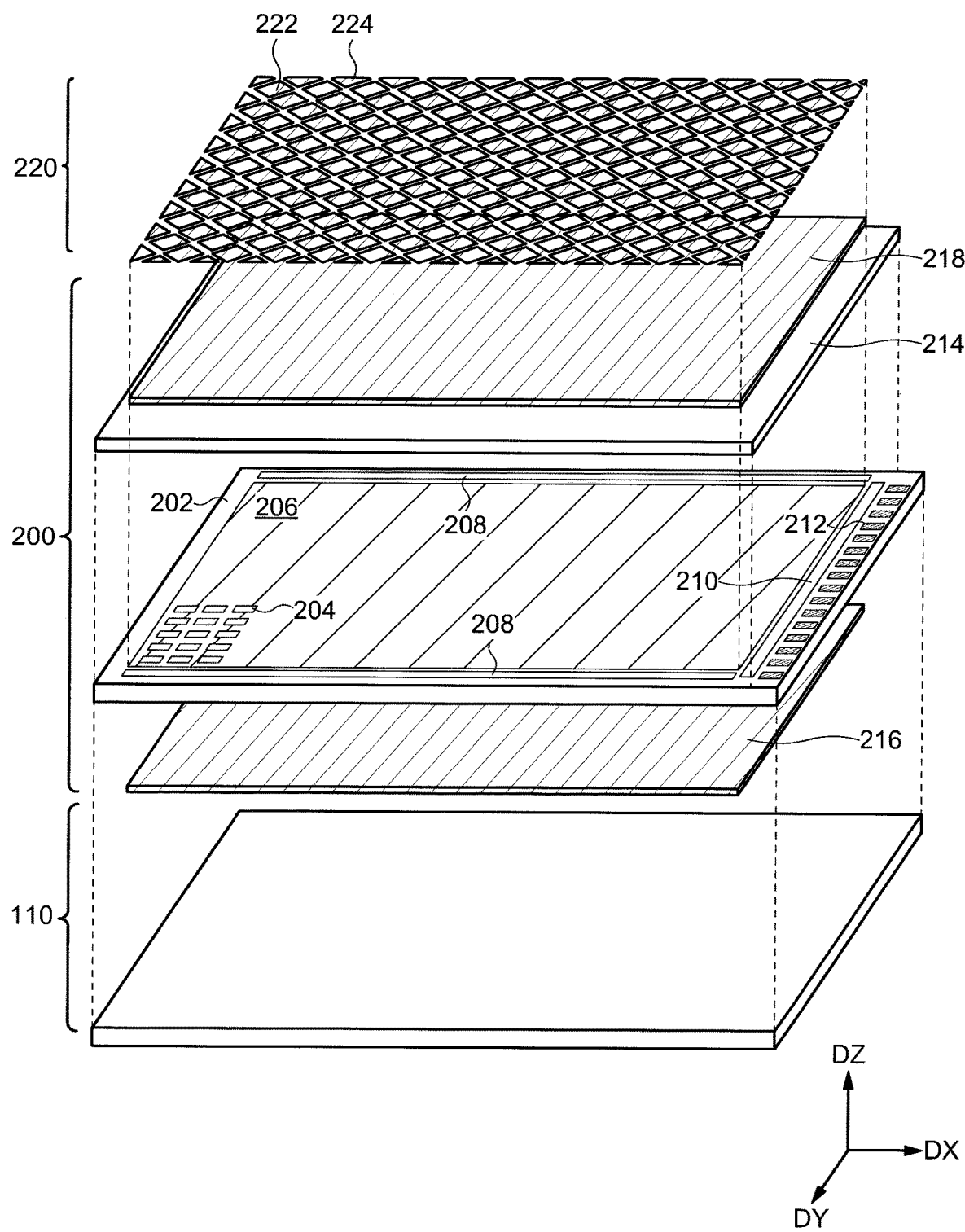
FIG. 1 is a schematic developed view of a display device according to an embodiment of the present invention.

FIG. 1 a schematic developed view showing an outline structure of the display device 100. In one example, a first direction DX, a second direction DY, and a third direction DZ are orthogonal to one another but may intersect at an angle other than 90°. The first direction DX and the second direction DY correspond to the direction parallel to a main surface of a substrate structuring the display device 100, while the third direction DZ corresponds to a thickness direction of the display device 100. In the present embodiment, a view of a DX-DY plan defined by the first direction DX and the second direction DY is defined as a plan view. A view of a plan including the third direction DZ exemplified by the DX-DZ plan or the DY-DZ plan is defined as a cross-sectional view.

The display device 100 has the light source device 110 and a liquid crystal display module 200 overlapping the light source device 110. The display device 100 may further include a touch sensor 220 over the liquid crystal display module 200.

In the present embodiment, a direction toward the liquid crystal display module 200 from the light source device 110 is defined as an upward direction, and a direction toward the light source device 110 from the liquid crystal display module 200 is defined as a downward direction.

The liquid crystal display module 200 has a first substrate 202, a second substrate 214 opposing the first substrate 202, a pair of polarizing plates 216 and 218 sandwiching the first substrate 202 and the second substrate 214, and a liquid crystal layer (not illustrated) sandwiched between the first substrate 202 and the second substrate 214. The first substrate 202 has a plurality of pixels 204, driver circuits (scanning-line driver circuits 208 and signal-line driver circuit 210) for driving the pixels 204, and a plurality of terminals 212. The pixels 204, the driver circuits, and the terminals 212 each have a stacked body of a conductive film, an insulating film, and a semiconductor film, and the like. The liquid crystal display module 200 has a display region 206 including the plurality of pixels 204 and a frame region which is a region other than the display region 206.

The polarizing plates 216 and 218 are arranged so as to overlap the display region 206. The liquid crystal display module 200 is supplied with a variety of signals including an image signal as well as a power source from an external circuit (not illustrated) through the terminals 212. The driver circuits are operated by these signals and the power source. The driver circuits control the pixels 204, by which an orientation of liquid crystal molecules included in the liquid crystal layer over the pixels 204 is controlled. The light emitted from the light source device 110 enters the liquid crystal display module 200, and the incident light is controlled in every pixel 204 to display an image.

The touch sensor 220 is arranged to overlap the display region 206. An electrostatic capacitive touch sensor of a mutual capacitive detection mode shown in FIG. 1 may be used as the touch sensor 220 for example. The touch sensor 220 has a plurality of first touch electrodes 222 extending in the first direction DX, a plurality of second touch electrodes 224 intersecting the first touch electrodes 222, and an insulating film (not illustrated) insulating these electrodes from one another. An electrostatic capacitance is formed between the first touch electrode 222 and the second touch electrode 224 and is varied when the touch sensor 220 is touched with an object such as a finger of a user. It is possible to judge whether a touch is present or not and to specify a position (coordinates) of the object by detecting the variation of the electrostatic capacitance, allowing a user to input a variety of instructions to the touch sensor 220. In the present specification, a touch means not only contact of an object but also includes proximity thereof. Although the light source device 110, the liquid crystal display module 200, and the touch sensor 220 are illustrated so as to be spaced away from one another in FIG. 1, these elements are fixed to one another using an adhesive, a housing, or the like. The touch sensor 220 of the present embodiment is not limited to the touch sensor of the mutual capacitive detection mode. A touch sensor of a self-capacity mode may be employed as the touch sensor 220.

Moreover, although the touch sensor 220 of the present embodiment is a so-called out-cell type touch sensor provided independently from the liquid crystal display module 200, the touch sensor 220 is not limited thereto. The touch sensor 220 may be a so-called in-cell type touch panel which is a touch sensor integrated with the liquid crystal display module 200. In the case of an in-cell type touch panel, the electrodes and wirings included in the liquid crystal display module 200 function as the touch electrodes.

2. Light Source Device

Figure 2:
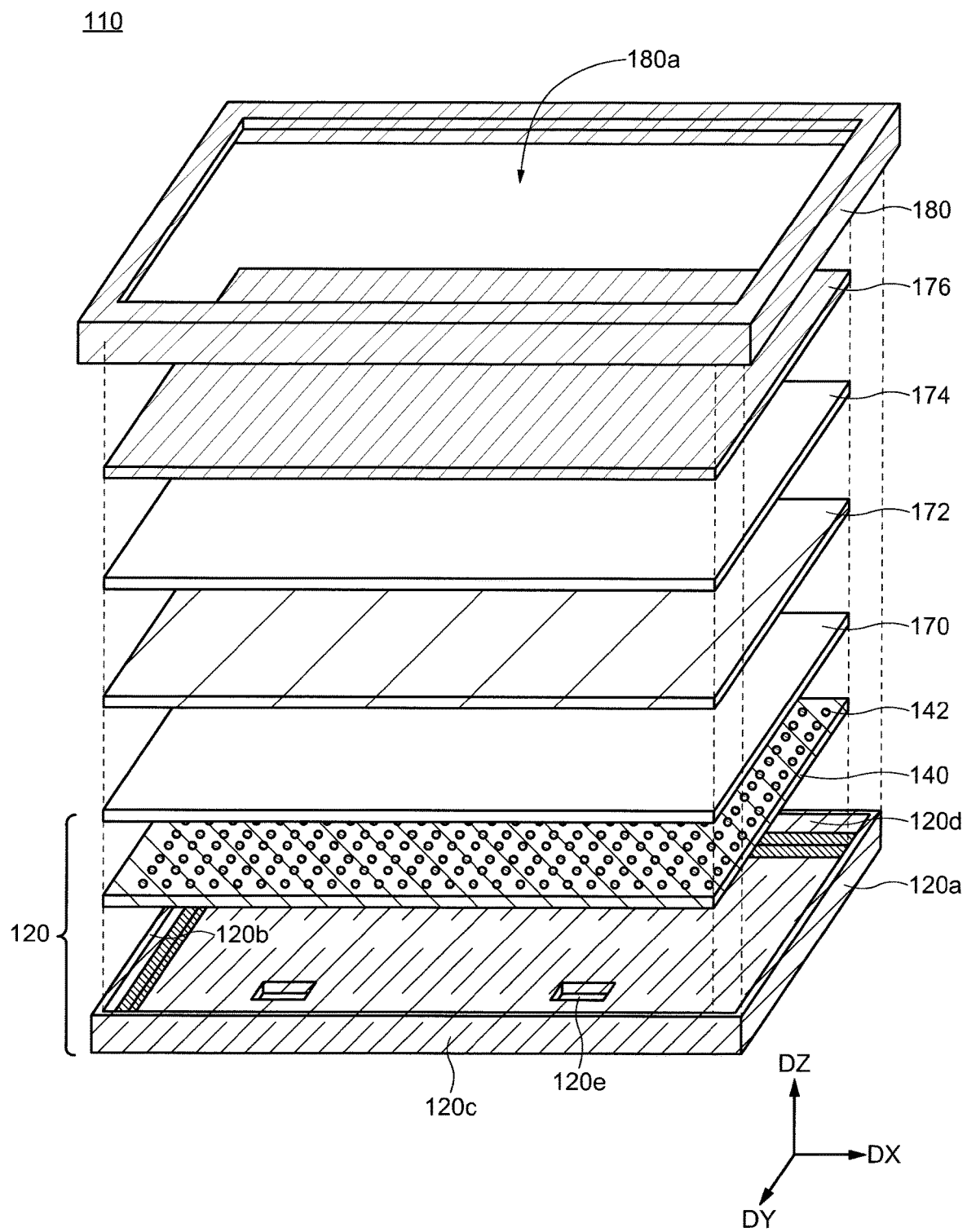
FIG. 2 is a schematic developed view of a light source device according to an embodiment of the present invention.

A schematic developed view of the light source device 110 is shown in FIG. 2. The light source device 110 has a rear vessel 120 and a front cover 180 engaged with the rear vessel 120. A light source substrate 140 and an optical sheet over the light source substrate 140 are arranged between the rear vessel 120 and the front cover 180. A light-diffusing plate 170, a prism sheet 174 over the light-diffusing plate 170, and a polarizing sheet 176 over the prism sheet 174 are included in the optical sheet. A plurality of inorganic light-emitting elements 142 is arranged over the light source substrate 140. The optical sheet may further have a wavelength-converting film 172 between the light-diffusing plate 170 and the prism sheet 174. Although not illustrated in FIG. 2, the wavelength-converting film 172 may not be disposed between the light-diffusing plate 170 and the prism sheet 174 but may be disposed between the light source substrate 140 and the light-diffusing plate 170.

2-1. Rear Vessel and Front Cover

The rear vessel 120 functions as a housing body accommodating the light source substrate 140 and the optical sheet (the light-diffusing plate 170, the prism sheet 174, the polarizing sheet 176, the wavelength-converting film 172 and the like) structuring the light source device 110. The rear vessel 120 includes side plates 120a to 120d and has a bottom plate located between the pair of side plates opposing each other (e.g., the pair of side plates 120a and 120b or the pair of side plates 120c and 120d). The bottom plate is integrated with the side plates 120a to 120d. It is preferred that the side plates 120a to 120d be arranged perpendicularly to an upper surface of the bottom plate. With this structure, the light from the inorganic light-emitting elements 142 can be efficiently utilized to supply the light to the liquid crystal display module 200. The rear vessel 120 is engaged with the front cover 180 to fix the light source substrate 140 and the optical sheet (the light-diffusing plate 170, the prism sheet 174, the polarizing sheet 176, the wavelength-converting film 172, and the like). The rear vessel 120 is provided with one or a plurality of openings 120e. The light source substrate 140 and the external circuit are electrically connected by a flexible printed circuit substrate (FPC) disposed through the openings 120e.

The rear vessel 120 and the front cover 180 include a metal such as aluminum, copper, and stainless steel. The rear vessel 120 may be formed by cutting or pressing a metal plate having a thickness equal to or more than 1 mm and equal to or less than 3 mm or equal to or more than 1 mm and equal to or less than 2 mm, for example. A thickness of the front cover 180 may be different from a thickness of the rear vessel 120. The front cover 180 may be formed by cutting or pressing a metal plate with a thickness equal to or more than 0.1 mm and equal to or less than 1 mm, equal to or more than 0.1 mm and equal to or less than 0.5 mm, or equal to or more than 0.1 mm and equal to or less than 0.4 mm, for example.

Note that it is not always necessary for the bottom plate of the rear vessel 120 to have a flat shape, and the bottom plate may have a curved surface shape. In this case, the light source substrate 140, the light-diffusing plate 170, the prism sheet 174, and the like are also arranged so as to fit the curved surface shape.

2-2. Light Source Substrate and Inorganic Light-Emitting Element

Figure 3:
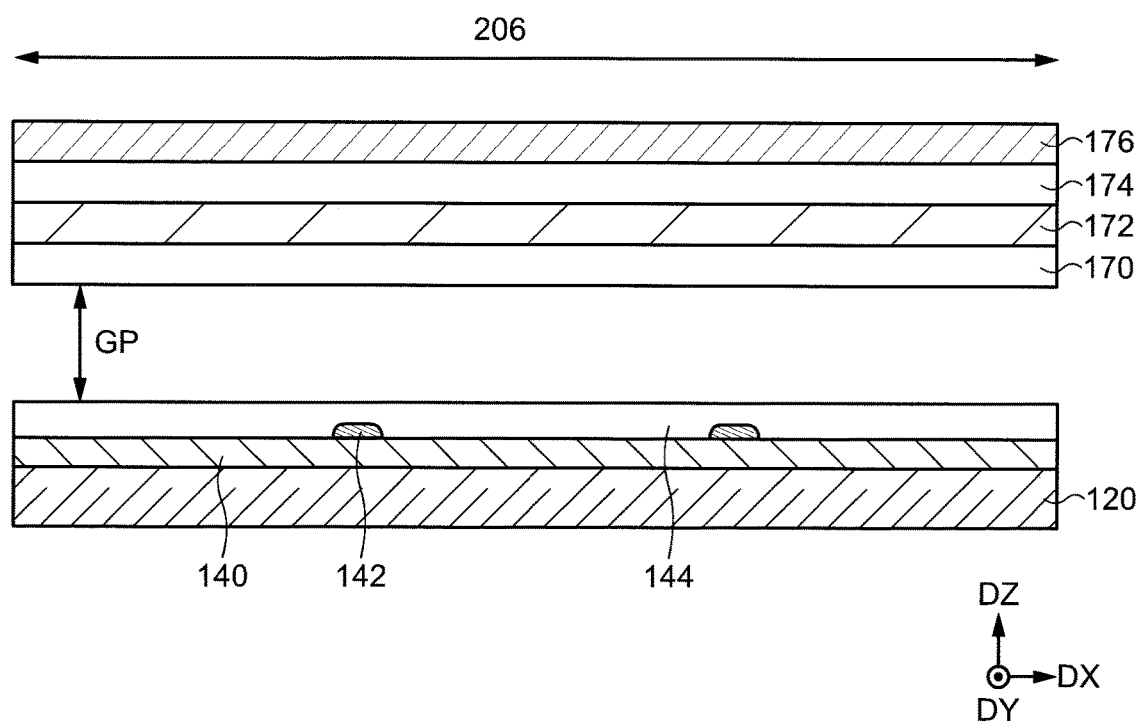
FIG. 3 is a schematic cross-sectional view of a light source device according to an embodiment of the present invention.

A schematic cross-sectional view of a part of the light source device 110 is shown in FIG. 3. As described above, the light source substrate 140 is accommodated in the rear vessel 120. The light source substrate 140 may be in contact with the rear vessel 120.

The plurality of inorganic light-emitting elements 142 is arranged over the light source substrate 140 and overlaps the display region 206. The inorganic light-emitting elements are arranged in a matrix form, for example. A pitch between adjacent inorganic light-emitting elements 142 may be arbitrarily set in accordance with the size of the display device 100. The pitch between adjacent inorganic light-emitting elements may be selected within a range equal to or more than 1 mm and equal to or less than 20 mm, equal to or more than 3 mm and equal to or less than 15 mm, or equal to or more than 5 mm and equal to or less than 10 mm. In order to provide the light with uniform luminance across the display region 206, the plurality of inorganic light-emitting elements 142 is preferably arranged with a uniform pitch.

The inorganic light-emitting element 142 includes a light-emitting diode in which an inorganic emitter such as gallium nitride and gallium nitride containing indium is sandwiched by a pair of electrodes and a protective film protecting the light-emitting diode. The inorganic light-emitting element 142 is configured to emit light by electroluminescence. As an inorganic emitter, an inorganic compound providing an emission peak between 400 nm and 530 nm may be selected, for example. Blue emission is extracted from the inorganic light-emitting element 142 through the protective film. Alternatively, a light-emitting diode may be used in which a color-conversion material converting the light from the inorganic emitter is dispersed in the protective film. Such a light-emitting diode emits white light because the light from the inorganic emitter and the light converted by the color-converting material are mixed. As a color-converting material, a fluorescent material emitting fluorescence in a green to red region, e.g., a fluorescent material emitting yellow fluorescence, may be used. In this case, the light-diffusing plate 170 and the prism sheet 174 may be arranged so as to be in contact with each other without providing the wavelength-converting film 172.

There is no limitation to the size of each inorganic light-emitting element 142, and a light-emitting diode occupying an area equal to or more than $1.0 \times 10^4$ µm² and equal to or less than $1.0 \times 10^6$ µm², equal to or more than $4.0 \times 10^4$ µm² and equal to or less than $5.0 \times 10^5$ µm², equal to or more than $9.0 \times 10^4$ µm² and equal to or less than $2.5 \times 10^5$ µm² may be used. As an example, a so-called micro-LED with a size of approximately 320 µm×300 µm may be used as the inorganic light-emitting element 142.

The light source device 110 may further include an overcoat 144 covering the inorganic light-emitting elements 142. The overcoat 144 may be in contact with the light source substrate 140. The overcoat 144 has a function to protect the inorganic light-emitting elements 142 and prevent the inorganic light-emitting elements 142 from separating from the light source substrate 140 and also absorbs depressions and projections caused by the inorganic light-emitting elements 142 to provide a flat surface. Moreover, although the inorganic light-emitting elements 142 provide light with relatively high directivity, the overcoat 144 can spread or diffuse the light from the inorganic light-emitting elements 142.

The overcoat 144 is preferred to have high transmissivity in the visible region. The overcoat 144 includes a polymer material exemplified by an acryl-based resin, a polycarbonate, or a polyester such as poly(ethylene terephthalate) or a silicon-containing inorganic compound such as silicon oxide, for example. A thickness of the overcoat 144 is preferred to be a thickness allowing the inorganic light-emitting elements 142 to be covered. The thickness of the overcoat 144 may be selected from a range equal to or more than 200 µm and equal to or less than 1 mm, equal to or more than 400 µm and equal to or less than 1 mm, or equal to or more than 500 µm and equal to or less than 800 mm, for example.

2-3. Light-Diffusing Plate

The light-diffusing plate 170 diffuses the light from the inorganic light-emitting elements 142 to provide a uniform light-emitting surface. A thickness of the light-diffusing plate 170 may be selected from a range equal to or more than 0.5 mm and equal to or less than 2 mm or equal to or more than 0.75 mm and equal to or less than 1.5 mm, for example. Arrangement of the light-diffusing plate 170 allows the highly directive light from the inorganic light-emitting elements 142 to be effectively diffused, which results in a decrease in luminance distribution on a plan on which the light-diffusing plate 170 is arranged. As a result, light with uniform luminance can be supplied to the prism sheet 174 and the wavelength-converting film 172.

The light-diffusing plate 170 is arranged away from the inorganic light-emitting elements 142. Specifically, a distance (also called an optical distance) from an upper surface of the light source substrate 140 (a surface of the DX-DZ plans closer to the liquid crystal display module 200) to a bottom surface of the light-diffusing plate 170 (a surface of the DX-DZ plans farther from the liquid crystal display module 200) is set to be equal to or more than 1 mm and equal to or less than 3 mm or equal to or more than 1.5 mm and equal to or less than 2.5 mm. Hence, the light-diffusing plate 170 is not in direct contact with the inorganic light-emitting elements 142 nor the overcoat 144. The structure for separating the light-diffusing plate 170 from the inorganic light-emitting elements 142 will be described below.

2-4. Wavelength-Converting Film

The wavelength-converting film 172 has a function to convert the wavelength of the light emitted from the inorganic light-emitting elements 142 and diffused by the light-diffusing plate 170 to generate white light and has a structure in which a fluorescent emitter is dispersed in a polymer material. The fluorescent emitter includes a fluorescent substance absorbing the blue light emitted from the inorganic light-emitting elements 142 and emitting fluorescence in a green to red region, e.g., yellow fluorescence. The aforementioned color-converting material may be used as a fluorescent substance. Alternatively, a quantum dot having a particle diameter of several nanometers to several tens of nanometer may be used instead of the fluorescent emitter.

The wavelength-converting film 172 may be disposed over or under the light-diffusing plate 170 as a separately prepared independent film or may be formed by applying, on or under the light-diffusing plate 170, a dispersion including the aforementioned polymer material or its precursor and the fluorescent emitter or the quantum dot, followed by performing curing.

2-5. Prism Sheet

The prism sheet 174 is an optical film efficiently and upwardly emitting the light which has passed through the light-diffusing plate 170 and the wavelength-converting film 172 and has a structure in which a plurality of prism shapes is arranged in parallel.

2-6. Polarizing Sheet

The polarizing sheet 176 is an anisotropic reflective polarizer, for example. More specifically, the polarizing sheet 176 reflects circularly polarized light or elliptically polarized light which does not match the transmission axis of the polarizing sheet 176 with a multilayer film formed in the polarizing sheet 176 and repeatedly recovers the reflected components. It is possible to prevent light loss and increase luminance of the emitted light by efficiently reflecting the light. Furthermore, an effect to diffuse the highly directive light emitted from the inorganic light-emitting elements 142 can be realized by providing the polarizing sheet 176.

2-7. Spacer

Figure 4A:
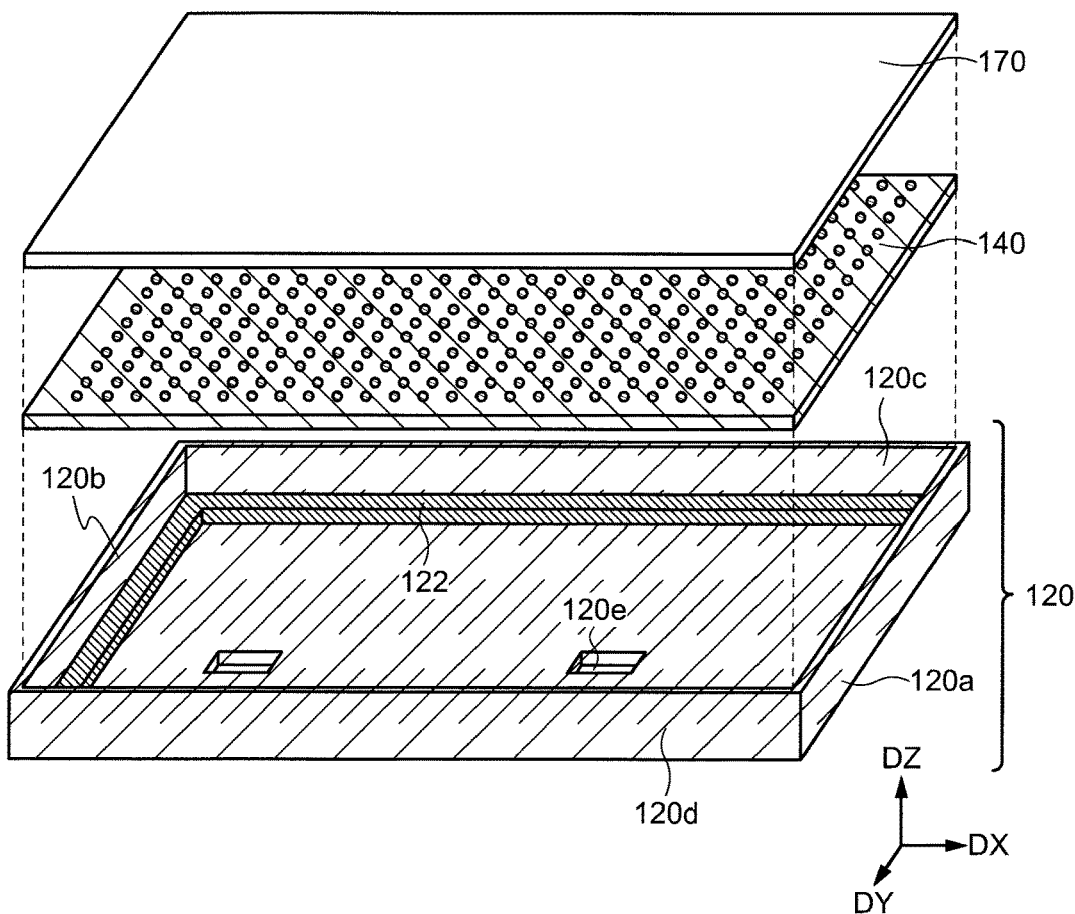
FIG. 4A and FIG. 4B are respectively schematic developed and top views of a light source device according to an embodiment of the present invention.
Figure 4B:
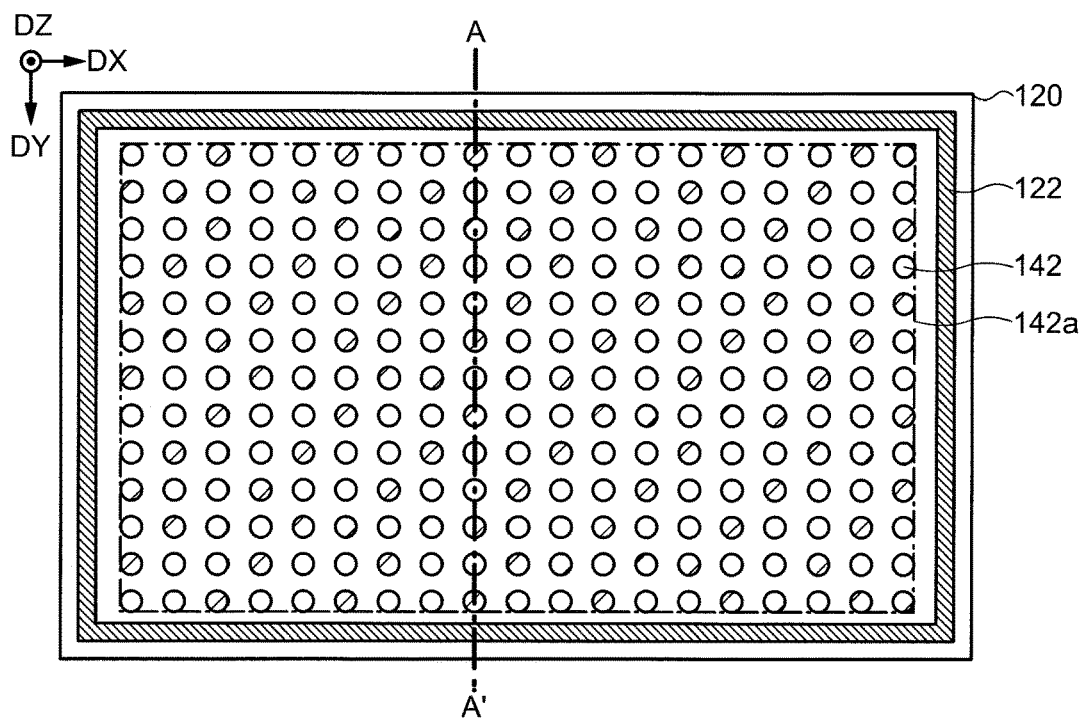

A schematic developed view including the rear vessel 120, the light source substrate 140, and the light-diffusing plate 170 is shown in FIG. 4A, and a top view of the rear vessel 120 and the inorganic light-emitting elements 142 is shown in FIG. 4B. In FIG. 4B, the light source substrate 140 and the light-diffusing plate 170 are not illustrated. The light-diffusing plate 170 is arranged away from the inorganic light-emitting elements 142 in the light source device 110 as described above, and a spacer 122 is arranged in the rear vessel 120 as a component for realizing this structure. Note that, when another optical sheet, e.g., the wavelength-converting film 172, is arranged closest to the inorganic light-emitting elements 142, the following explanation may be interpreted by replacing the light-diffusing plate 170 with the wavelength-converting film 172.

(1) Positional Relationship Between Spacer and Inorganic Light-Emitting Elements The spacer 122 is disposed under the light-diffusing plate 170, and at least a part of the spacer 122 overlaps the light-diffusing plate 170 in a plan view. Although the spacer 122 may overlap the inorganic light-emitting elements 142 under the light-diffusing plate 140, the spacer 122 is preferred to be arranged not to overlap the inorganic light-emitting element 142 over the light source substrate 140. More specifically, when a region of the upper surface of the light source substrate 140 overlapping the plurality of inorganic light-emitting elements 142 is defined as a region 142a, the spacer 122 and the light source substrate 140 are arranged in the rear vessel 120 so that the region 142a does not overlap the spacer 122 as shown in FIG. 4B. In other words, the spacer 122 is arranged within a region of the upper surface of the light source substrate 140 on which no inorganic light-emitting element 142 is disposed. The light from the inorganic light-emitting elements 142 is not blocked by the spacer 122 and enters the light-diffusing plate 170 by arranging the spacer 122 in this manner.

(2) Shape and Arrangement of Spacer

Figure 5A:
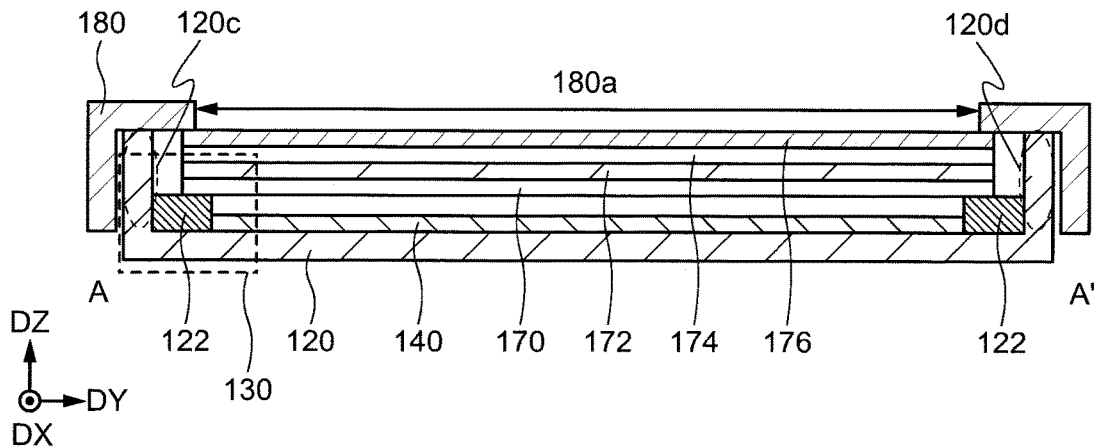
FIG. 5A to FIG. 5C are schematic cross-sectional views of a light source device according to an embodiment of the present invention.
Figure 5B:
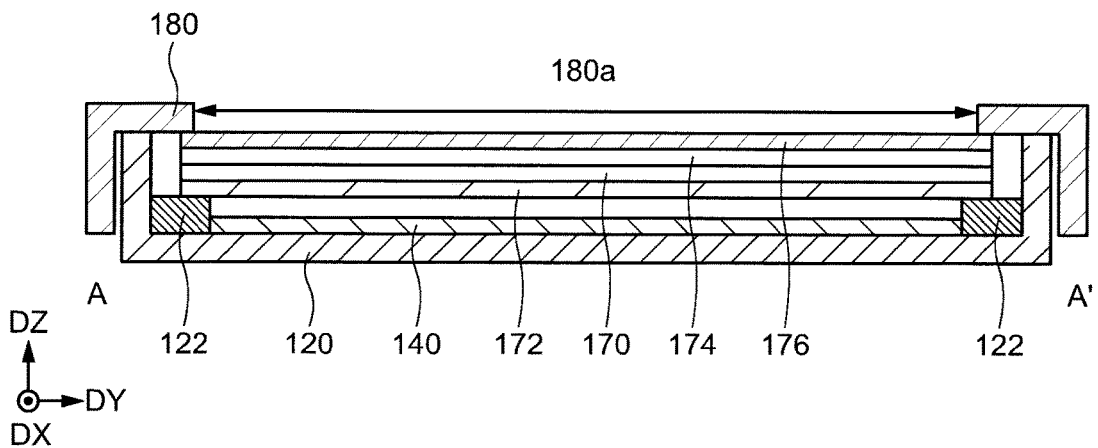
Figure 5C:
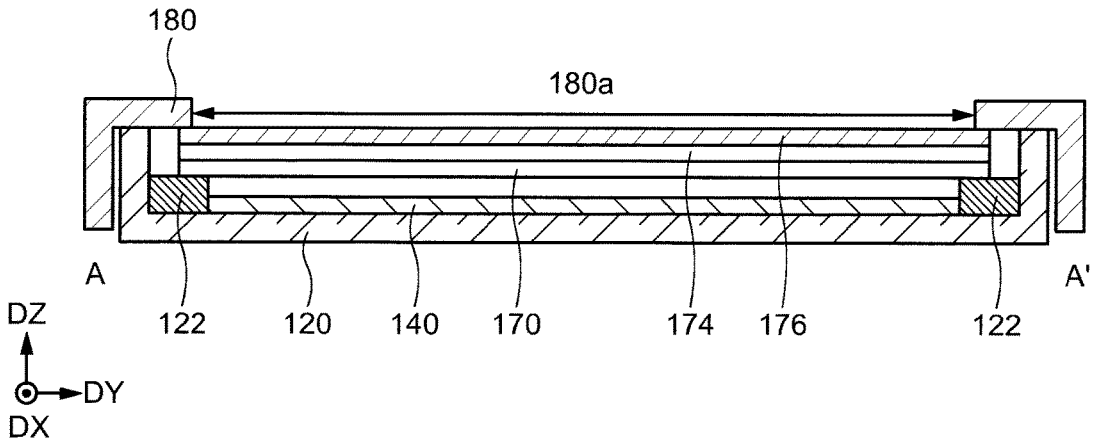
Figure 6A:
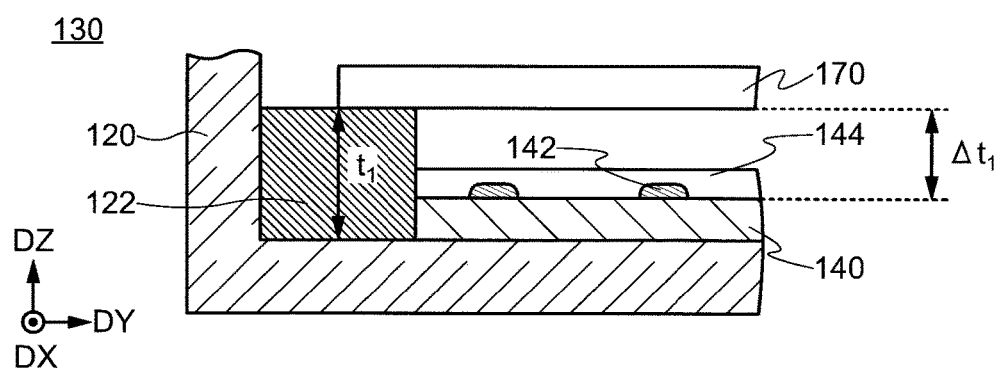
FIG. 6A to FIG. 6D are schematic cross-sectional views of a light source device according to an embodiment of the present invention.
Figure 6B:
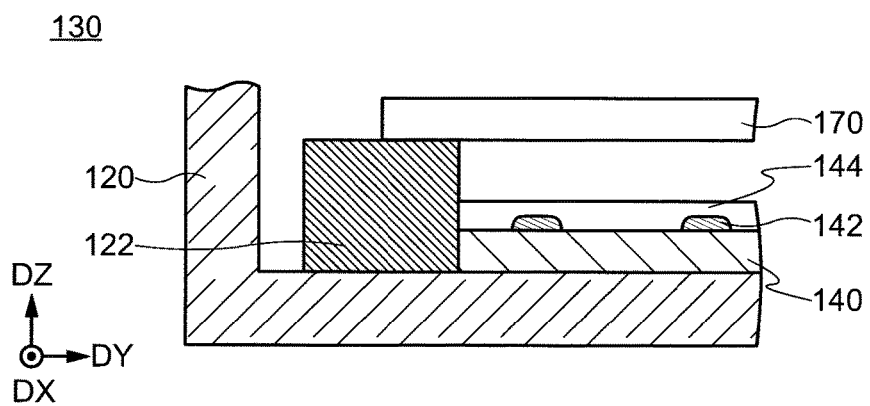
Figure 6C:
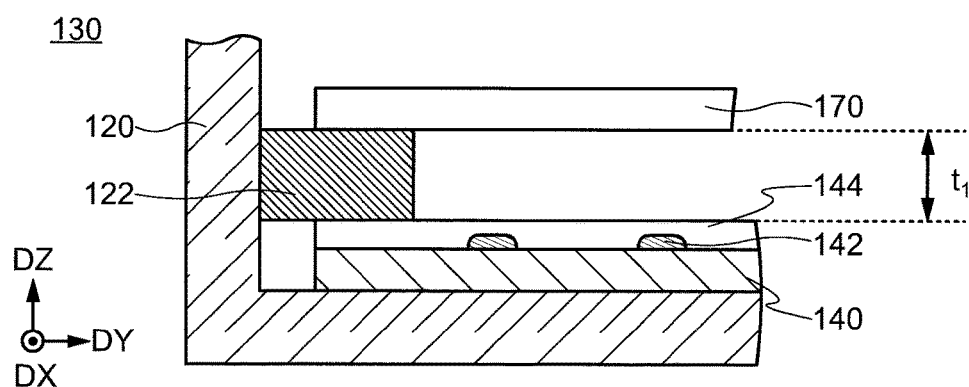
Figure 6D:
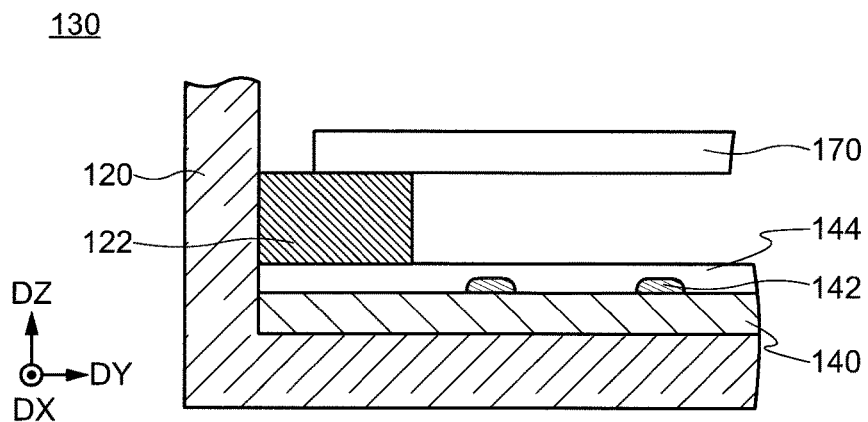
Figure 7A:
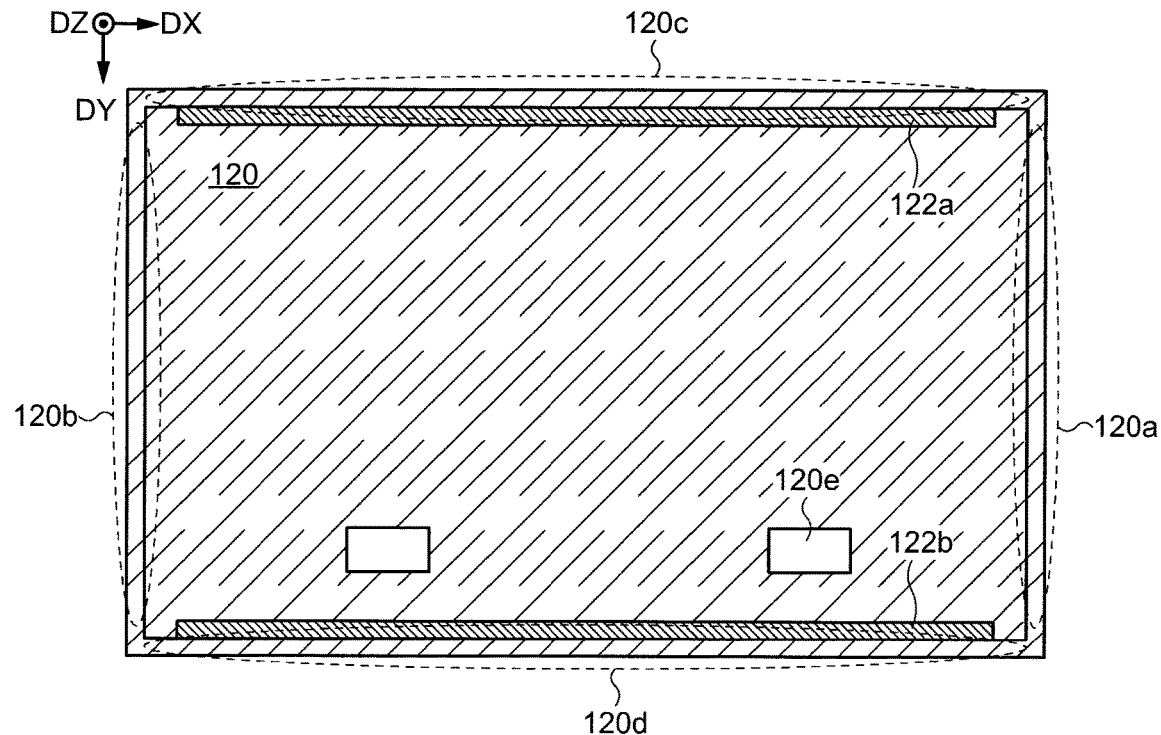
FIG. 7A and FIG. 7B are schematic top views of a light source device according to an embodiment of the present invention.
Figure 7B:
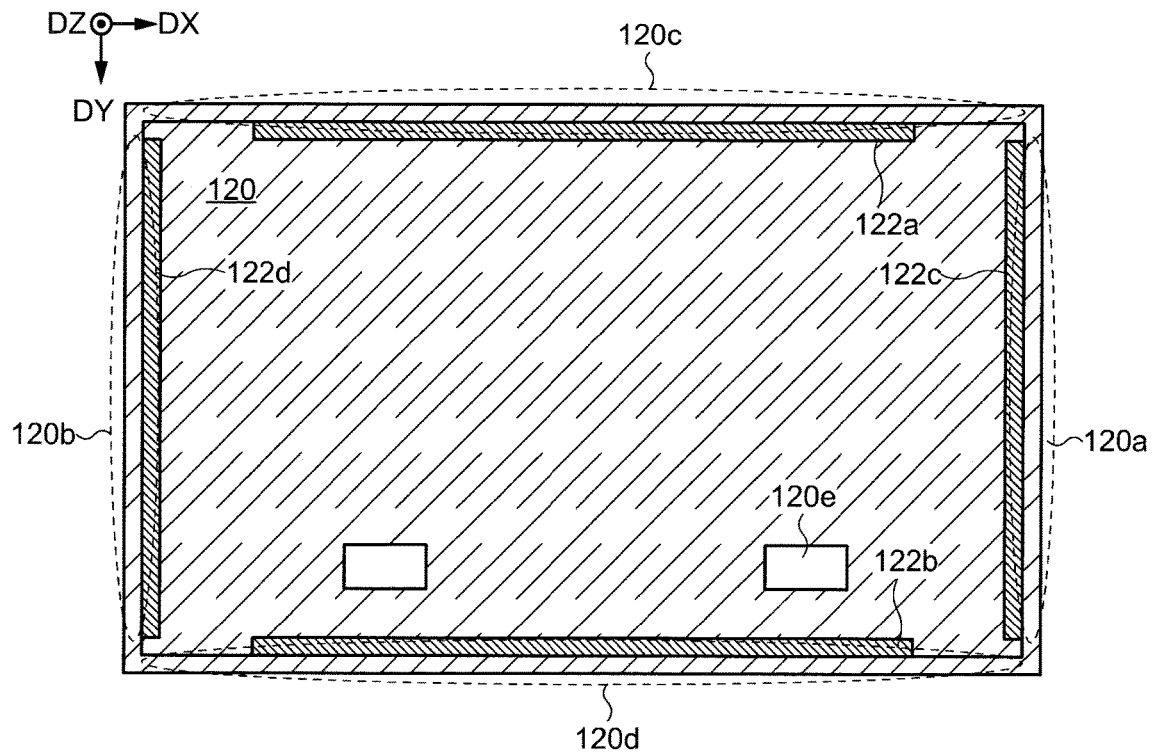
Figure 8:
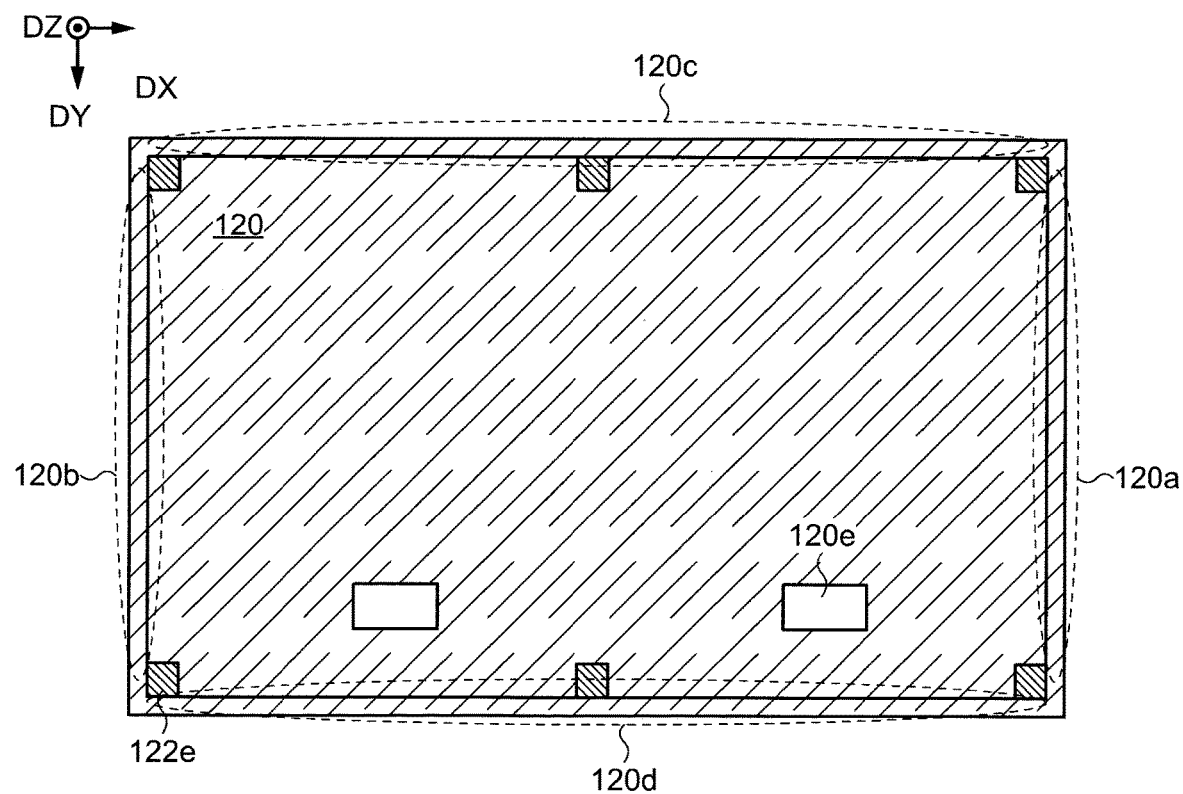
FIG. 8 is a schematic top view of a light source device according to an embodiment of the present invention.

An example of the shape and arrangement of the spacer 122 is explained using FIG. 4A to FIG. 10B. FIG. 5A to FIG. 5C are schematic views of the cross-section along the chain line A-A' in FIG. 4B. In FIG. 5A to FIG. 5C, the inorganic light-emitting elements 142 and the overcoat 144 are not illustrated for visibility. FIG. 6A to FIG. 6C and FIG. 9A to FIG. 9C are extended views of a region 130 in FIG. 5A. FIG. 7A to FIG. 8 are schematic top views of the rear vessel 120 and the spacer 122.

As shown in FIG. 4A to FIG. 5A, the spacer 122 has a closed shape in a plan parallel to the upper surface of the light source substrate 140 and is arranged so as to surround the plurality of inorganic light-emitting elements 142 in a plan view, for example. As an example, when the first substrate 202 of the liquid crystal display module 200 is a rectangle, the spacer 122 has a plurality of linear portions which is arranged along the side plates 120a to 120d because the rear vessel 120 and the light source substrate 140 accommodated therein also have a rectangular shape.

The spacer 122 may be arranged so as to be in contact with all of or a part of the side plates 120a to 120d of the rear vessel 120 (FIG. 5A). The spacer 122 may be further arranged so as to be in contact with the upper surface of the bottom plate of the rear vessel 120 (FIG. 5A). In this case, the spacer 122 does not overlap the light-source substrate 140, and the light-source substrate 140 is surrounded by the spacer 122. The light source substrate 140 is fixed to the upper surface of the bottom plate of the rear vessel 120 by utilizing an adhesive or a double-sided tape which is not illustrated.

Although the spacer 122 is in contact with the bottom surface of the light-diffusing plate 170 in the example of FIG. 5A, the wavelength-converting film 172 can be arranged between the light-diffusing plate 170 and the light source substrate 140 as described above. In this case, the spacer 122 is arranged so as to be in contact with a bottom surface of the wavelength-converting film 172 (FIG. 5B). When the wavelength-converting film 172 is not provided, a bottom surface of the prism sheet 174 is in contact with the light-diffusing plate 170 (FIG. 5C).

FIG. 6A is an extended view of the region 130. As demonstrated in FIG. 6A, a thickness of the spacer 122 is preferred to be larger than a thickness of the light source substrate 140 when the light source substrate 140 does not overlap the spacer 122. For example, a difference $\Delta t_1$ between the thickness $t_1$ of the spacer 122 and the thickness of the light source substrate 140 is within a range equal to or more than 1 mm and equal to or less than 3 mm or equal to or more than 1.5 mm and equal to or less than 2.5 mm. A gap between a bottom surface of the optical sheet (the light-diffusing plate 170 in FIG. 6A) and the upper surface of the light source substrate 140 is maintained at a distance identical to the difference $\Delta t_1$.

It is not always necessary for the spacer 122 to be in contact with all of the side plates 120a to 120d of the rear vessel 120, and the spacer 122 may be spaced away from a part of or all of the side plates. An example is shown in FIG. 6B where the spacer 122 is spaced away from all of the side plates 120a to 120d of the rear vessel 120. Alternatively, the spacer 122 may be disposed so as to overlap the light source substrate 140 in order to allow the spacer 122 to be in contact with the light source substrate 140 or the overcoat 144 formed thereover (FIG. 6C). In addition to the structure of FIG. 6C, the light source substrate 140 may be in contact with all of or a part of the side plates 120a to 120d of the rear vessel 120 (FIG. 6D). When the overcoat 144 is provided, a summation of the thickness of the overcoat 144 and the thickness $t_1$ of the spacer 122 is adjusted to be equal to or more than 1 mm and equal to or less than 3 mm or equal to or more than 1.5 mm and equal to or less than 2.5 mm. When the overcoat 144 is not provided, the thickness $t_1$ is adjusted to be equal to or more than 1 mm and equal to or less than 3 mm or equal to or more than 1.5 mm and equal to or less than 2.5 mm. The thickness $t_1$ of the spacer 122 becomes a distance between the bottom surface of the light-diffusing plate 170 and the upper surface of the light-source substrate 140.

Alternatively, a pair of linear rods 122a and 122b (first linear rod 122a and 122b) opposing each other may be provided as the spacer 122 as shown in FIG. 7A. The pair of linear rods 122a and 122b respectively extends along two side plates (here, the side plates 120c and 120d) opposing each other. Even with such an arrangement, it is possible to stably hold the light-diffusing plate 170 with the pair of linear rods 122a and 122b to maintain the distance between the light source substrate 140 and the light-diffusing plate 170. In addition, the spacer 122 may further include an additional pair of linear rods 122c and 122d (second linear rods 122c and 122d) opposing each other as shown in FIG. 7B. The pair of linear rods 122c and 122d respectively extends along the other pair of side plates (here, side plates 120a and 120b). The spacer 122 may be arranged so that the directions in which the pair of linear rods 122c and 122d extends orthogonally intersect the directions in which the pair of linear rods 122a and 122b extends.

Alternatively, a plurality of pads 122e separated from each other may be provided as the spacer 122 as shown in FIG. 8. It is possible to hold the light-diffusing plate 170 by arranging at least three pads 122e in the rear vessel 120. With this structure, the distance between the light source substrate 140 and the optical sheet can be maintained. Four or more pads 122e may be provided in order to more stably hold the light-diffusing plate 170. In this case, it is preferred that four pads 122e be located at the corners of the bottom plate of the rear vessel 120. When five or more pads 122e are provided, the plurality of pads 122e is preferably arranged so that the direction in which three pads 122e align is parallel or substantially parallel to the direction in which the side plates of the rear vessel 120 (side plates 120c and 120d in FIG. 8) extend.

(3) Cross-Sectional Shape

Figure 9A:
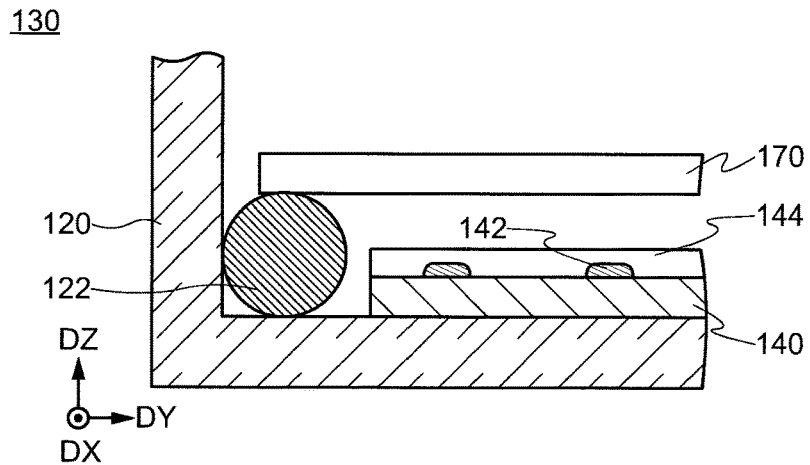
FIG. 9A to FIG. 9C are schematic cross-sectional views of a light source device according to an embodiment of the present invention.

A cross-sectional shape of the spacer 122 in the DY-DZ plan is not limited to a polygon such as a rectangle and may be a circle or an ellipse as shown in FIG. 9A.

Figure 9B:
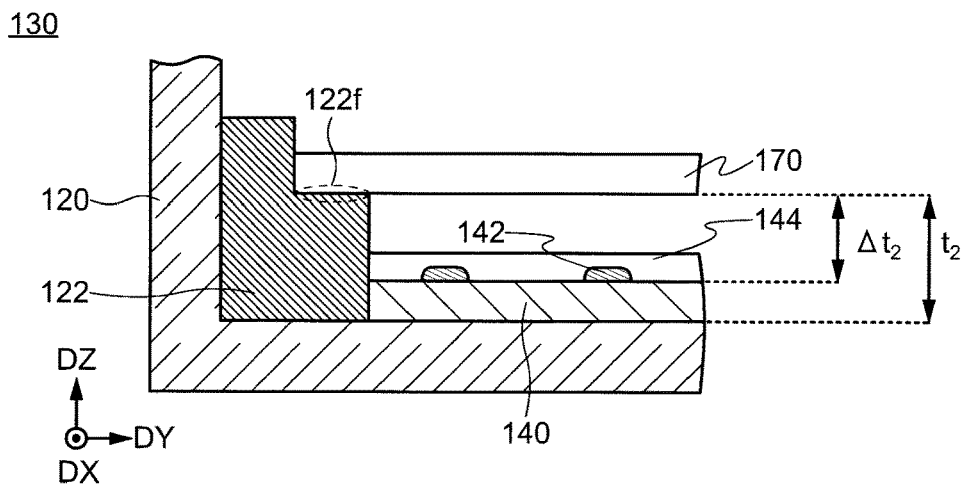
Figure 9C:
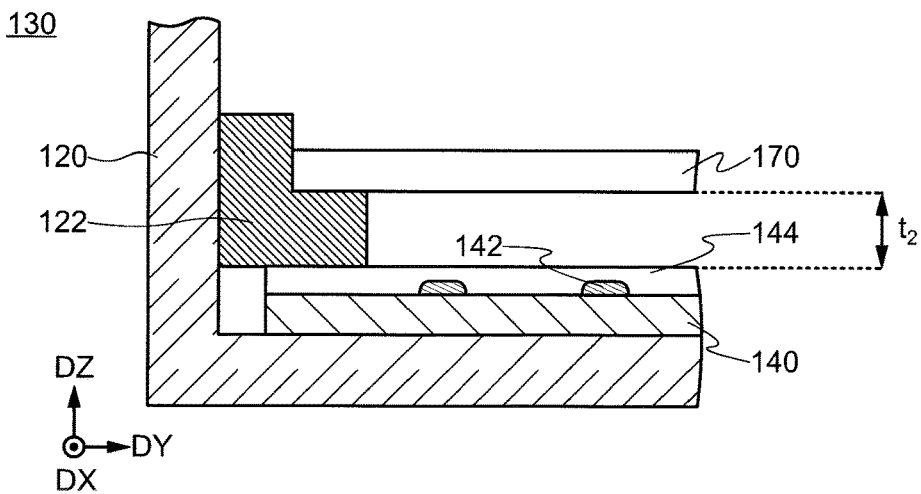

Alternatively, the spacer 122 may have a stair shape in a cross-sectional view as shown in FIG. 9B. One or a plurality of steps 122f is formed in the spacer 122 shown in FIG. 9B. The step 122f is a plan located between the bottom surface and the upmost surface and is a plan (DX-DY plan) parallel to the upper surface of the light source substrate 140. The light-diffusing plate 170 is arranged over and in contact with the step 122f. The spacer 122 having the step 122f is arranged so as to be in contact with the upper surface of the rear vessel 120. A difference $\Delta t_2$ between a height $t_2$ of the step 122f (that is, a distance from the bottom surface of the spacer 122 to the step 122f) is set within a range equal to or more than 1 mm and equal to or less than 3 mm or equal to or more than 1.5 mm and equal to or less than 2.5 mm. Moreover, the spacer 122 having the step 122*f* may be arranged so as to overlap the light source substrate 140 (FIG. 9C). In the structure shown in FIG. 9C, the height $t_2$ of the step 122*f* and a summation of the height $t_2$ and the thickness of the overcoat 144 in the case where the overcoat 144 is further provided are each the same as the aforementioned range of $\Delta t_2$. Although not illustrated, when the wavelength-converting film 172 is arranged between the light source substrate 140 and the light-diffusing plate 170, the wavelength-converting film 172 is arranged over the spacer 122 so that the step 122*f* and the wavelength-converting film 172 are in contact with each other.

Figure 10A:
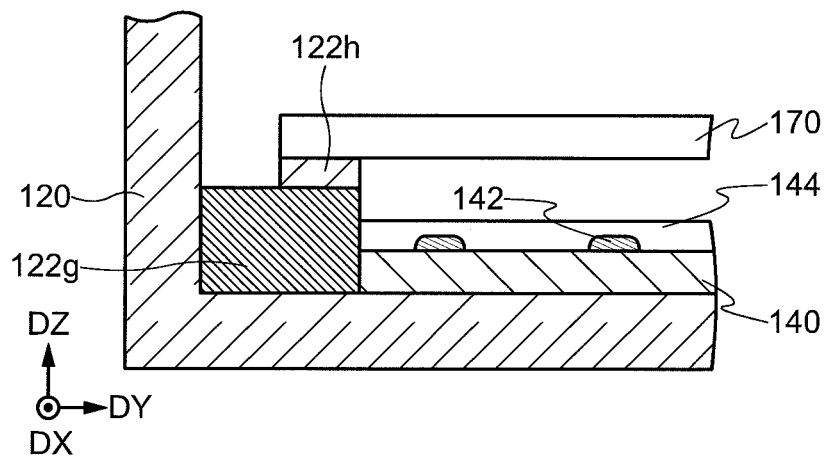
FIG. 10A and FIG. 10B are schematic cross-sectional views of a light source device according to an embodiment of the present invention.
Figure 10B:
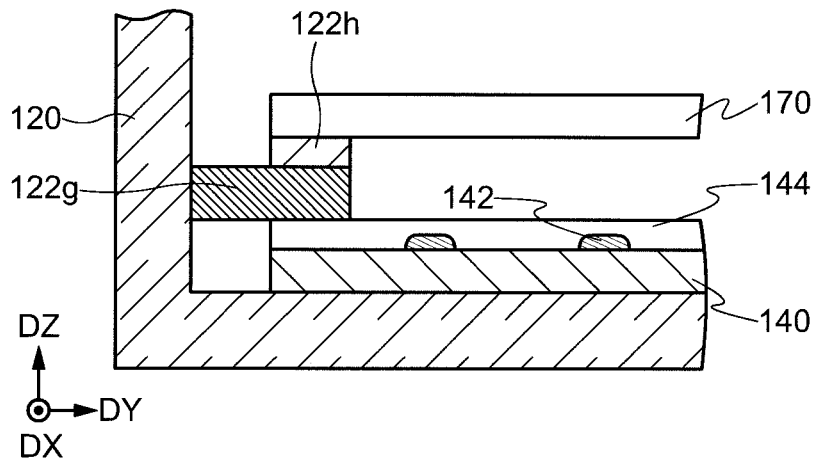

Alternatively, the spacer 122 may be composed of a plurality of layers. For example, the spacer 122 may include a first supporting layer 122*g* and a second supporting layer 122*h* located over and in contact with the first supporting layer 122*g* as shown in FIG. 10A and FIG. 10B. The first supporting layer 122*g* and the second supporting layer 122*h* may include materials different from each other. For example, the first supporting layer 122*g* may include a metal as a first material whereas the second supporting layer 122*h* may include a polymer material as a second material. The second supporting layer 122*h* may be configured so that at least one surface has adhesion. When the spacer 122 is structured by a plurality of supporting layers, the thickness of the spacer 122 means a summation of the plurality of supporting layers.

(4) Material

There is no limitation to the material structuring the spacer 122, and the material may be a metal or an alloy such as aluminum, copper, zinc, iron, stainless steel, and brass or may be a polymer material. An acrylic resin, an epoxy resin, an urethane resin, a silicone resin, a phenol resin, a polyolefin such as polyethylene and polypropylene, polystyrene, polyacrylonitrile, polybutadiene, polyisoprene, a polyester such as poly(ethylene terephthalate), a polycarbonate, and the like are represented as a polymer material.

As described above, the light source substrate 140 over which the plurality of inorganic light-emitting elements 142 is arranged and the optical sheet (the light-diffusing plate 170, the prism sheet 174, the polarizing sheet 176, and the like) are accommodated between the rear vessel 120 and the front cover 180 and are fixed to each other in the light source device 110. The liquid crystal display module 200 is arranged over the light source device 110 to structure the display device 100. In the light source device 110, the spacer 122 is arranged under the light-diffusing plate 170 to maintain a sufficient distance between the light source substrate 140 and the optical sheet. Hence, even when the highly directive light is emitted from the inorganic light-emitting elements 142, the emitted light is diffused in the space between the light source substrate 140 and the light-diffusing plate 170. Furthermore, the emitted light is repeatedly reflected in this space to further reduce directivity. As a result, the localized generation of a region with high luminance (hot spot) is prevented on the bottom surface of the light-diffusing plate 170. Moreover, the light with decreased intensity distribution by the space between the light source substrate 140 and the light-diffusing plate 170 is further diffused by the light-diffusing plate 170, and the light with uniform luminance enters the liquid crystal display module 200. Hence, the light with uniform luminance is supplied to the display region 206, which allows the display device 100 to provide high quality display.

In addition, the inorganic light-emitting elements 142 functioning as a light source may be arranged to overlap the display region 206 in a plan view in the display device 100 of the present embodiment. Compared with the structure in which a light source is arranged in the frame region, no reflecting plate is required to reflect the light to the side of the liquid crystal display module 200. Thus, the number of components structuring the light source device can be reduced, which contributes to thinning of a display device. Moreover, since it is not necessary to arrange a light source in the frame region, it is possible to reduce the frame region and to increase an area of the display region 206 with respect to the whole of the display device 100. Hence, implementation of the present embodiment enables the production of a display device with an excellent design.

Second Embodiment

In the present embodiment, a light source device 112 having a different structure from the light source device 110 of the First Embodiment is explained. An explanation of the structures the same as or similar to those described in the First Embodiment may be omitted.

The light source device 112 of the Second Embodiment is different from the light source device 110 of the First Embodiment in that a recessed portion, a through hole, a cutoff, or a trench is provided to the optical sheet (the light-diffusing plate 170 or the wavelength-converting film 172) and that at least a part of the spacer 122 is located in the recessed portion, the through hole, the cutoff, or the trench. Specific structures are explained below using FIG. 11A to FIG. 15B.

Figure 11A:
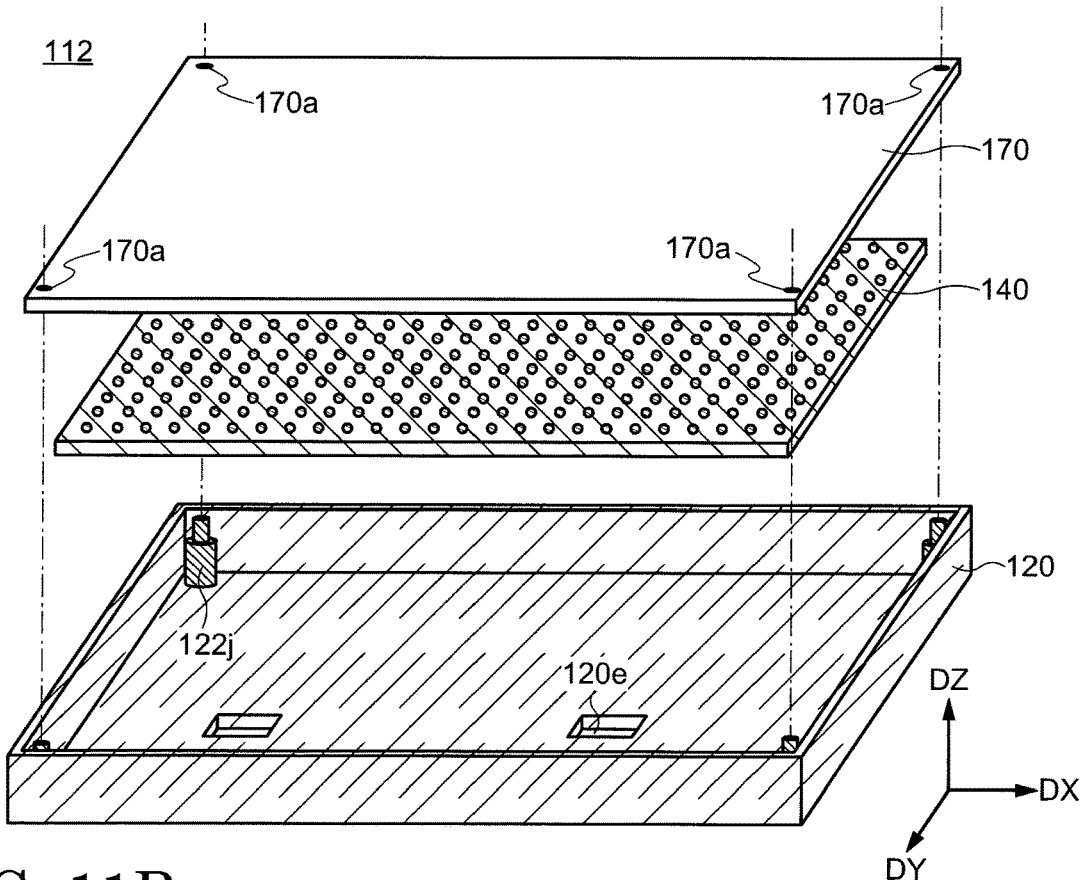
FIG. 11A and FIG. 11B are respectively schematic developed and top views of a light source device according to an embodiment of the present invention.
Figure 11B:
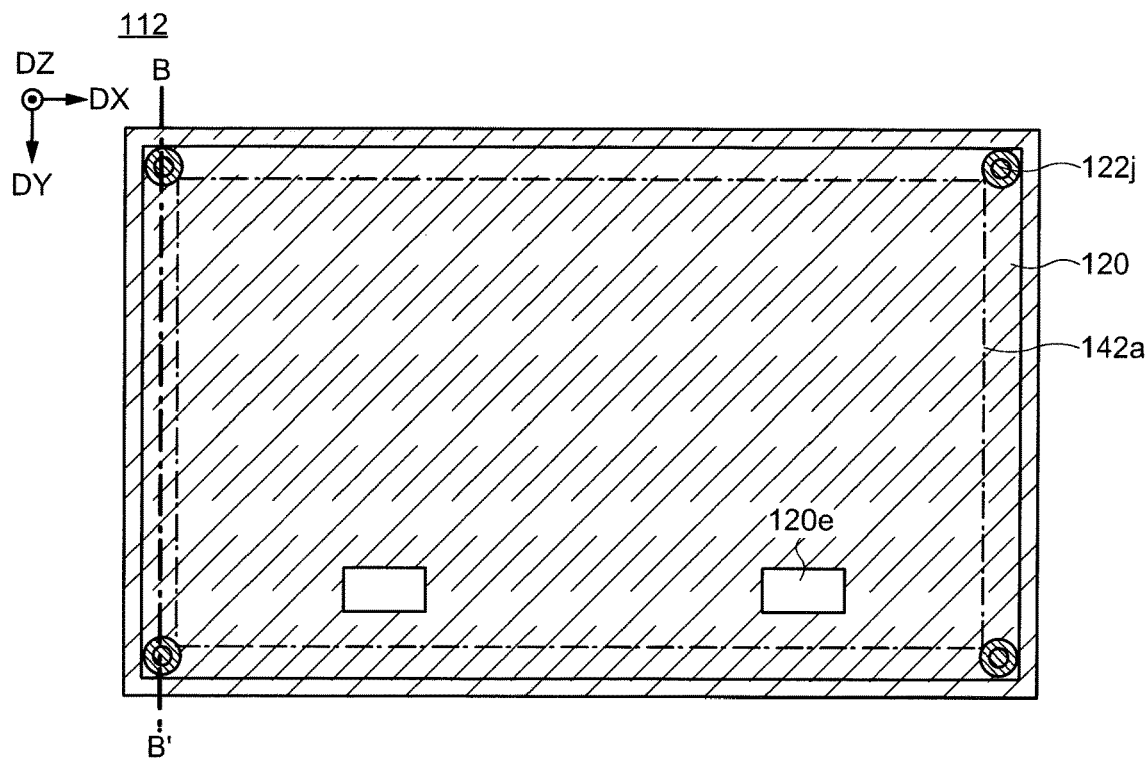

FIG. 11A is a schematic view in which the light-diffusing plate 170 is developed from the rear vessel 120, the spacer 122, the light source substrate 140, and the optical sheet included in the light source substrate 112, whereas FIG. 11B is a schematic top view of the rear vessel 120 and the spacer 122. As shown in FIG. 11A, the light source device 112 has a supporting pin 122*j* as the spacer 122 arranged in the rear vessel 120. There is no limitation to the number of supporting pins 122*j*, and the number may be at least three or more and is preferred to be 4 or more. When four supporting pins 122*j* are arranged, the supporting pins 122*j* are preferred to be arranged at the four corners of the rear vessel 120. When four or more supporting pins 122*j* are arranged, it is preferred to arrange the supporting pins 122*j* so that, similar to the pads 122*e*, the direction in which three of the supporting pins 122*j* align is parallel or substantially parallel to the direction in which the side plate of the rear vessel 120 extends. Note that, in the case where another optical sheet such as the wavelength-converting film 172 is arranged closest to the inorganic light-emitting elements 142, the following explanation may be interpreted by replacing the light-diffusing plate 170 of the present embodiment with the wavelength-converting film 172.

The supporting pins 122*j* are arranged so as not to overlap the region 142*a*. In other words, among the upper surface of the light source substrate 140, the region 142*a* (see FIG. 4B) overlapping the plurality of inorganic light-emitting elements 142 does not overlap the supporting pin 122*j* in a plan view (FIG. 11B).

Figure 12A:
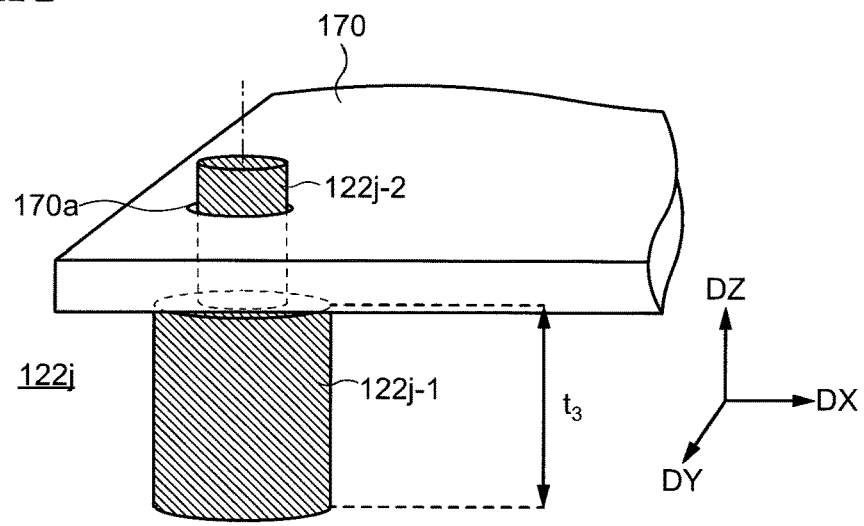
FIG. 12A is a schematic perspective view and FIG. 12B.

A plurality of through holes 170*a* corresponding to the positions of the supporting pins 122*j* is provided to the light-diffusing plate 170 (FIG. 11A). At least a part of each supporting pin 122*j* is arranged in the corresponding through hole 170*a*. For example, each supporting pin 122*j* has a lower portion 122*j*-1 and an upper portion 122*j*-2, where the upper portion 122*j*-2 passes through the through holes 170*a*, but the lower portion 122*j*-1 does not pass through the through hole 170a as shown in FIG. 12A. Thus, an area of a cross section (a cross section parallel to the upper surface of the light source substrate 140) of the upper portion 122j-2 is smaller than a cross-sectional area of the lower portion 122j-1.

Figure 12B:
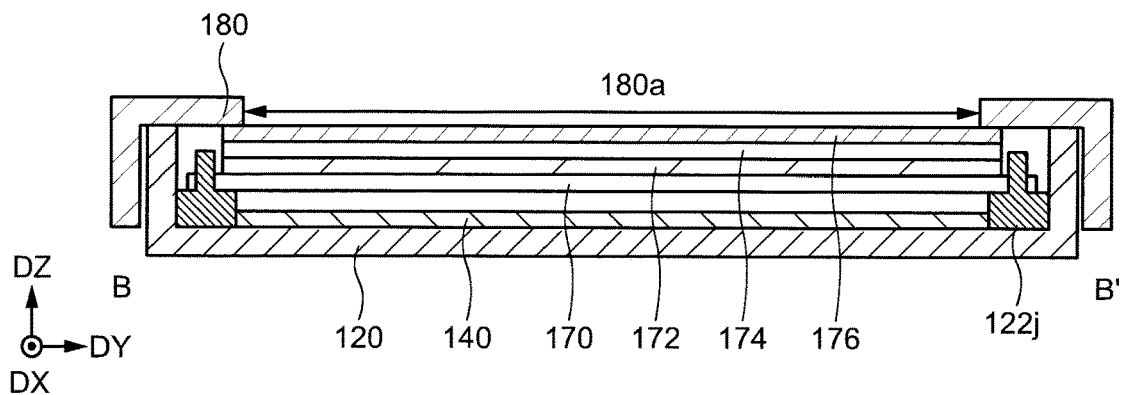
FIG. 12C are schematic cross-sectional views of a light source device according to an embodiment of the present invention.

A schematic view of a cross section along a chain line B-B' in FIG. 11B is illustrated in FIG. 12B. As demonstrated in FIG. 12B, the upper portion 122j-2 may pass through the through hole 170a. In addition, the upper portion 122j-2 may not completely pass through the through hole 170a although this is not illustrated.

In such a structure, a thickness $t_3$ of the lower portion 122j-1 (a length in the third direction DZ) contributes to the separation between the light source substrate 140 and the light-diffusing plate 170. Specifically, when the supporting pins 122j do not overlap the light-source substrate 140, a difference $\Delta_3$ between the thickness $t_3$ of the lower portion 122j-1 and the thickness of the light source substrate 140 is adjusted within a range equal to or more than 1 mm and equal to or less than 3 mm or equal to or more than 1.5 mm and equal to or less than 2.5 mm. The difference $\Delta t_3$ in thickness is the distance between the light source substrate 140 and the light-diffusing plate 170. On the other hand, when the supporting pins 122j are arranged over the light source substrate 140, the thickness $t_3$ of the lower portion 122j-1 and a summation of the thickness $t_3$ and the thickness of the overcoat 144 in the case where the supporting pins 122j are arranged over the overcoat 144 are each the same as the aforementioned range.

Figure 12C:
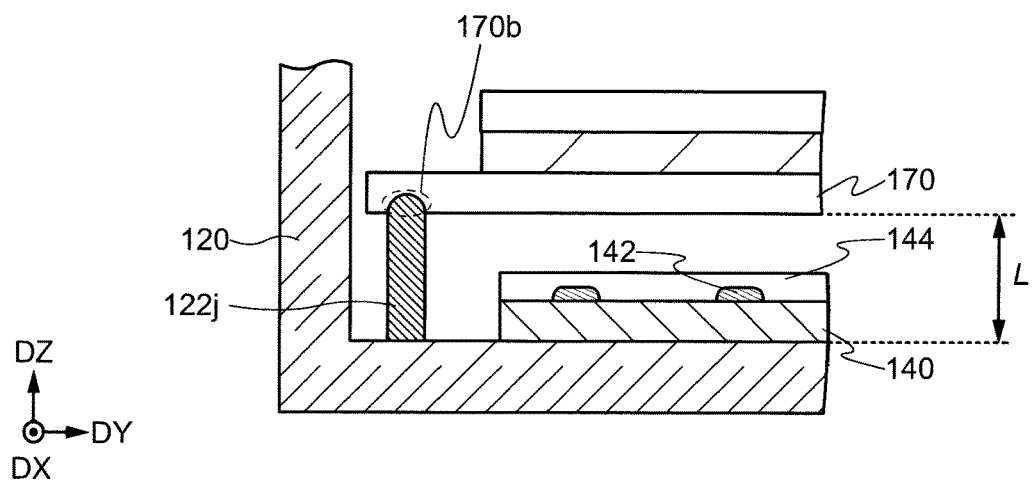

Alternatively, the recessed portion 170b may be formed in the light-diffusing plate 170 instead of the through hole 170a, and a part of the supporting pin 122j may be accommodated in the recessed portion 170b as shown in FIG. 12C. In the structure shown in FIG. 12C, a difference between a length L of a portion of the supporting pin 122j exposed from the recessed portion 170b and the thickness of the light source substrate 140 is the distance between the light source substrate 140 and the light-diffusing plate 170 when the supporting pin 122j does not overlap the light source substrate 140 in a plan view. On the other hand, the length L is adjusted within the aforementioned range in the case where the supporting pin 122j is arranged over the light source substrate 140 whereas a summation of the length L and the thickness of the overcoat 144 is adjusted within the aforementioned range in the case where the overcoat 144 is further arranged.

Figure 13A:
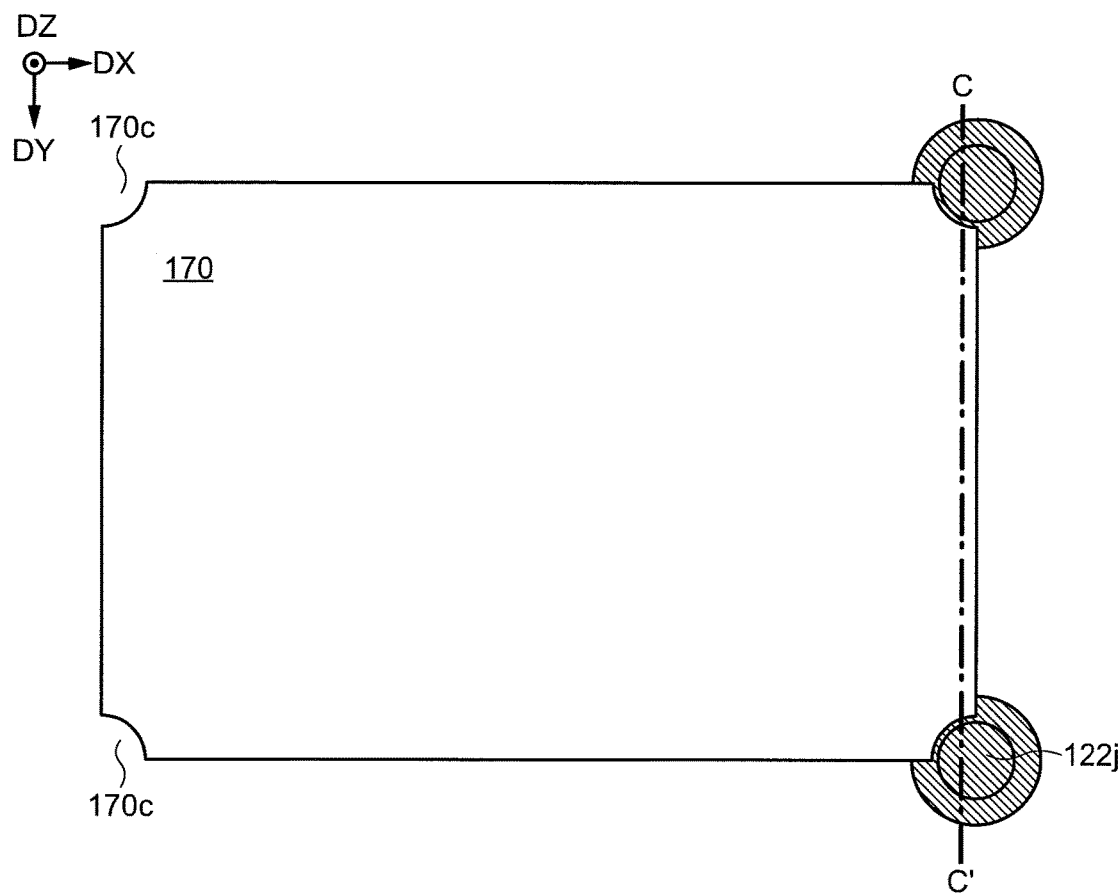
FIG. 13A and FIG. 13B are respectively schematic top and cross-sectional views of a light source device according to an embodiment of the present invention.
Figure 13B:
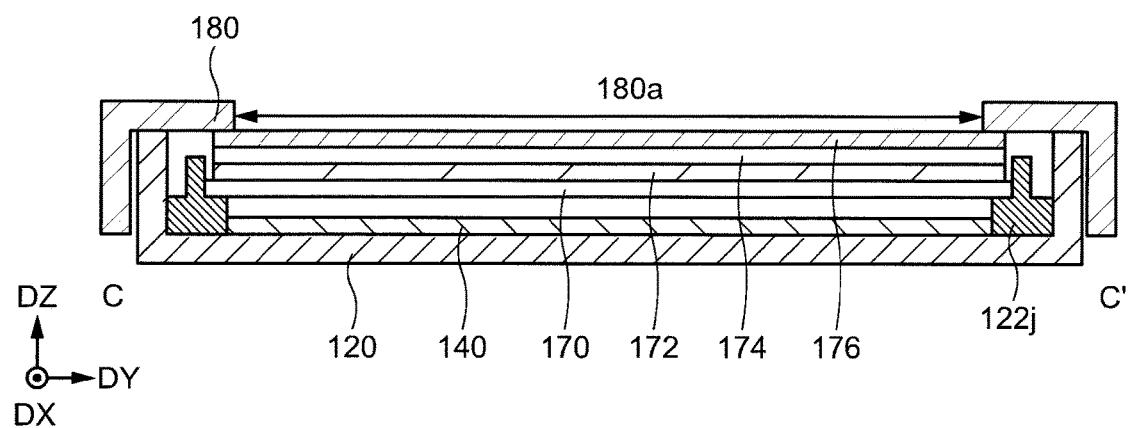

Alternatively, the cutoff 170c may be formed at the corner of the light-diffusing plate 170 instead of the through hole 170a and the recessed portion 170b as shown in FIG. 13A. The cutoff 170c and a part of the supporting pin 122j are arranged to overlap each other. As demonstrated in a schematic view of a cross section along a chain line C-C' in FIG. 13A (FIG. 13B), the upper portion 122j-2 of the supporting pin 122j overlaps the cutoff 170c, while an upper surface of the lower portion 122j-1 is in contact with the bottom surface of the light-diffusing plate 170.

Figure 14A:
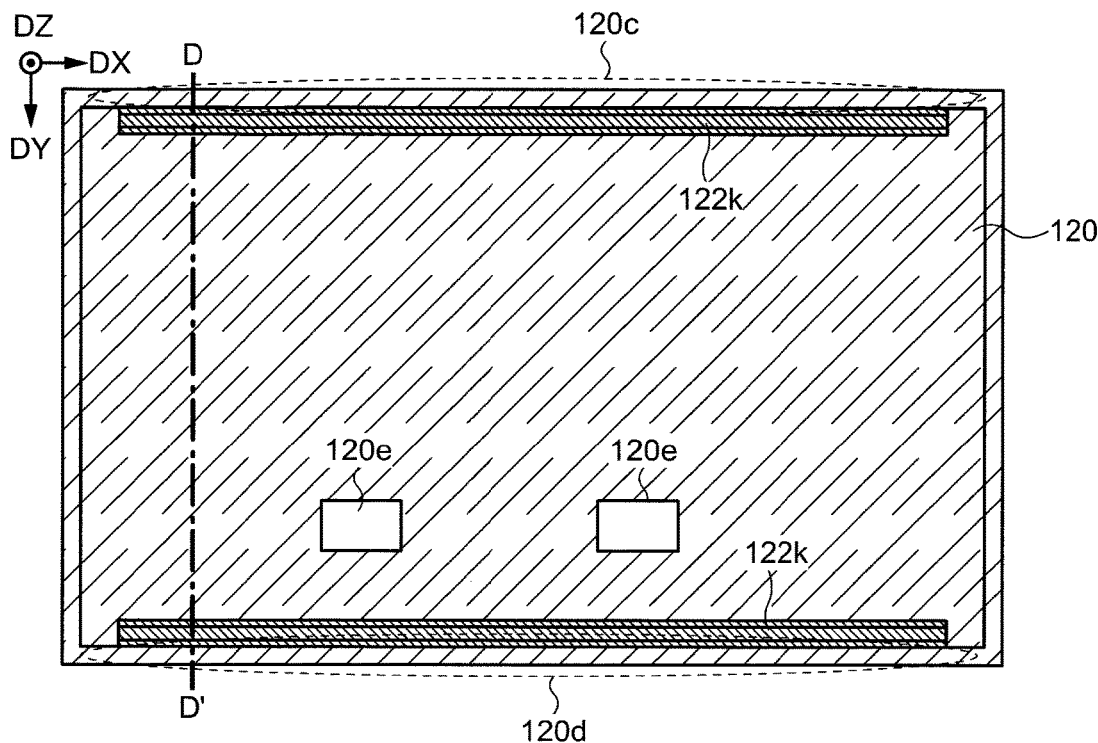
FIG. 14A and FIG. 14B are schematic top views and FIG. 14C is a schematic cross-sectional view of a light source device according to an embodiment of the present invention.
Figure 14B:
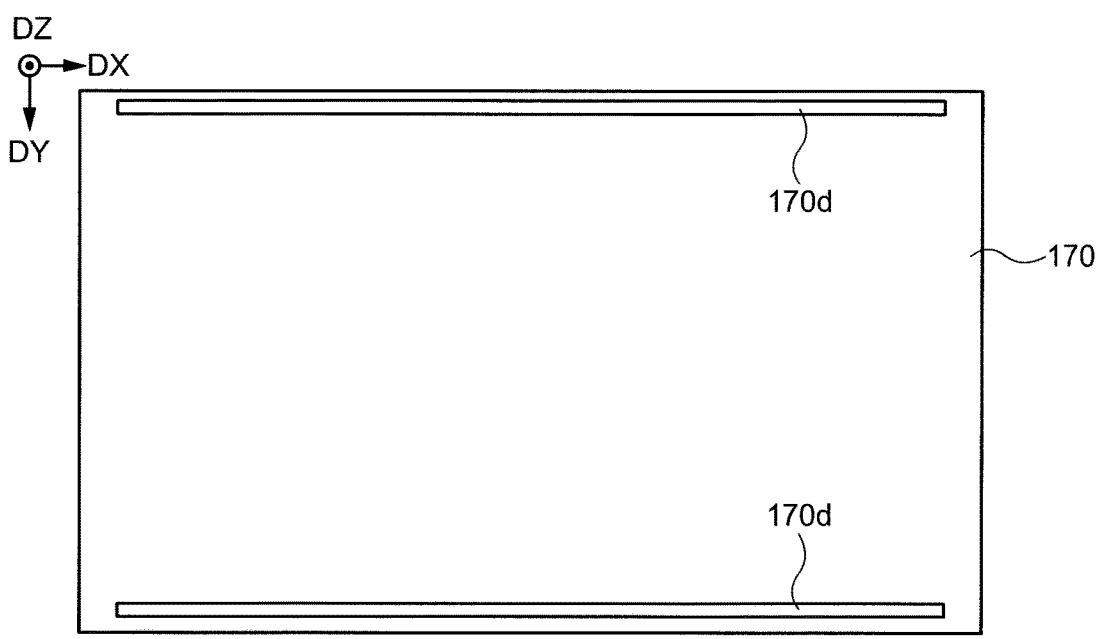
Figure 14C:
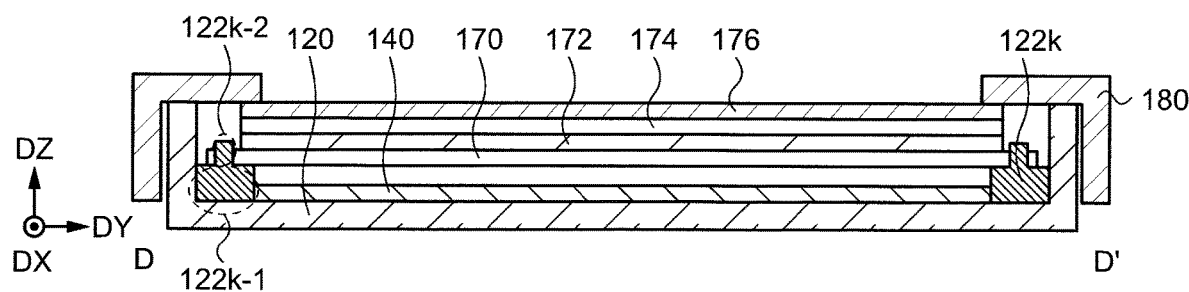

Alternatively, a pair of rails 122k may be provided as the spacer 122 as shown in FIG. 14A. The pair of rails 122k extends along the side plates opposing each other (the side plates 120c and 120d in the example shown in FIG. 14A) and parallel to these side plates. Moreover, the pair of rails 122k is arranged to sandwich the region 142a in a plan view. On the other hand, the light-diffusing plate 170 is provided with a pair of trenches 170d at the positions corresponding to the pair of rails 122k (FIG. 14B). At least a part of each rail 122k is accommodated in the trench 170d. For example, each rail 122k has an upper portion 122k-2 extending parallel to the side plate and having a smaller width than a width of the trench 170d as well as a lower portion 122k-1 extending parallel to the side plate and having a larger width than the width of the trench 170d as shown in a schematic view (FIG. 14C) of a cross section along a chain line D-D' in FIG. 14A. The bottom surface of the light-diffusing plate 170 is in contact with an upper surface of the lower portion 122k-1. The trench 170d may pass through the light-diffusing plate 170 or may be a trench which does not pass through the light-diffusing plate 170 and has a bottom, although this is not illustrated.

Figure 15A:
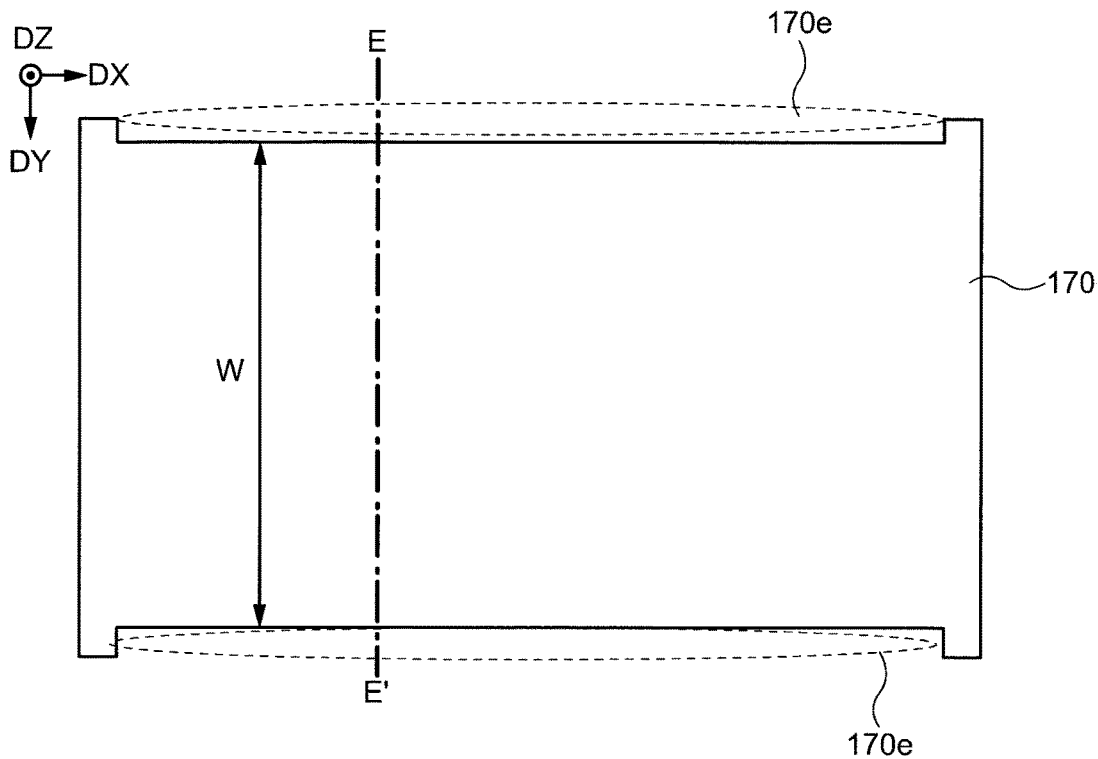
FIG. 15A and FIG. 15B are respectively schematic top and cross-sectional views of a light source device according to an embodiment of the present invention.
Figure 15B:
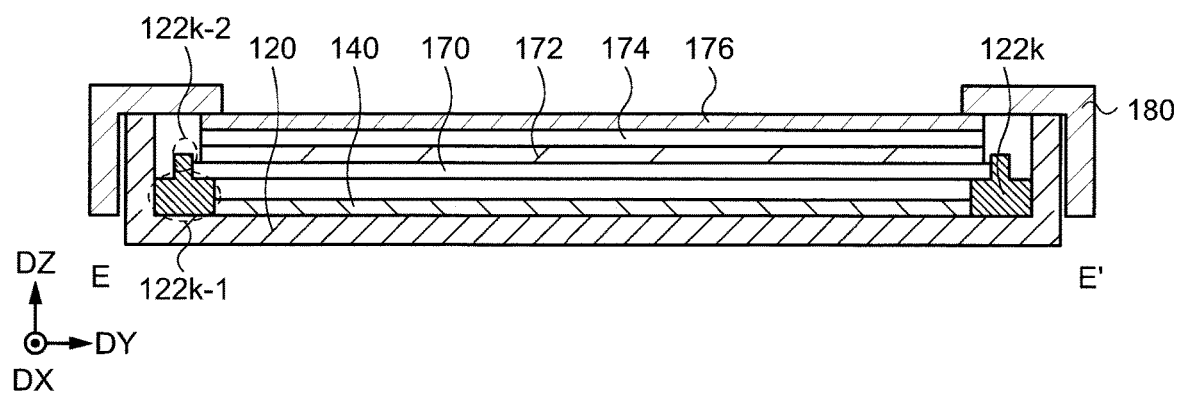

Alternatively, when the pair of rails 122k is provided as the spacer 122, a pair of linear cutoffs 170e may be formed along a long side or a short side of the light-diffusing plate 170, that is, along the first direction DX or the second direction DY, instead of the trench 170d as shown in FIG. 15A. As shown in a schematic view (FIG. 15B) of a cross section along a chain line E-E' in FIG. 15A, a length W of a region sandwiched by the pair of cutoffs 170e is shorter than a distance between the upper portions 122k-2 of the pair of rails 122k and longer than a distance between the lower portions 122k-1. In this structure, the space between the light source substrate 140 and the light-diffusing plate 170 can be maintained with the pair of rails 122k.

Although not illustrated, two pairs of rails 122k may be provided as the spacer 122. In this case, the rails 122k are preferably arranged so that a direction in which one pair of rails 122k extends is perpendicular to a direction in which the other pair of rails 122k extends. Specifically, one pair of rails 122k extending in the first direction DX and one pair of rails 122k along the second direction DY may be provided as the spacer 122. Two pairs of trenches 170d or two pairs of cutoffs 170e corresponding to two pairs of rails 122k are formed in the light-diffusing plate 170.

Note that, in the case where the wavelength-converting film 172 is provided between the light source substrate 140 and the light-diffusing plate 170, the through hole 170a, the recessed portion 170b, the cutoff 170c, or the trench 170d may be formed in the wavelength-converting film 172.

In the light source device 112 of the present embodiment, it is also possible to space the inorganic light-emitting elements 142 and the optical sheet away from each other by the spacer 122 including the supporting pin 122j or the rail 122k and to keep the distance between the inorganic light-emitting elements 142 and the optical sheet constant. Hence, the same effects as the First Embodiment can be achieved.

Third Embodiment

In the present embodiment, a light source device 114 having a different structure from those of the light source devices 110 and 112 is explained using FIG. 16A to FIG. 18C. An explanation of the structures the same as or similar to those described in the First and Second Embodiments may be omitted.

Figure 16A:
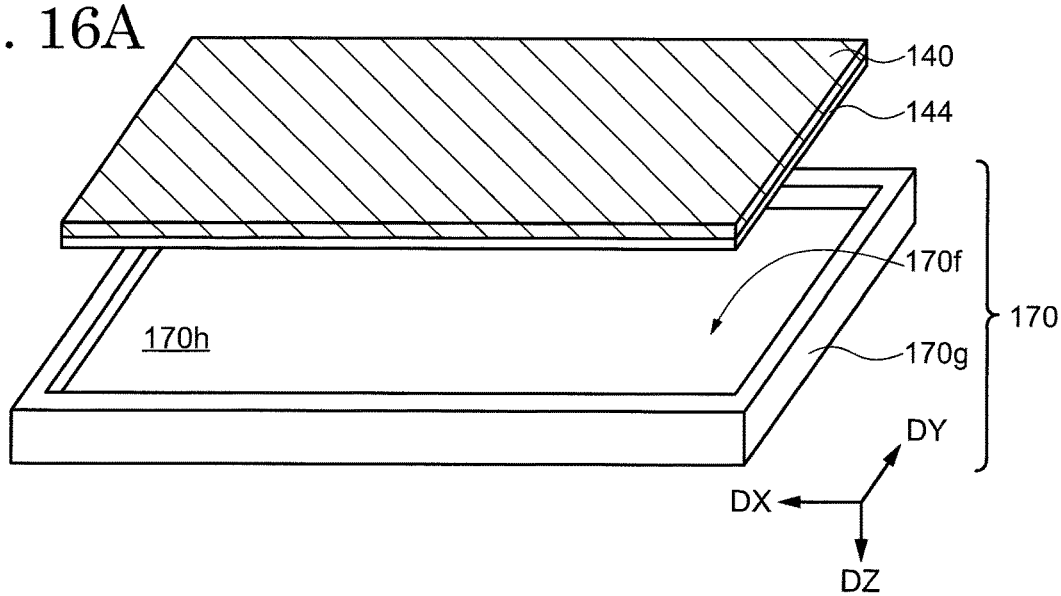
FIG. 16A is a schematic developed view of a light source device according to an embodiment of the present invention.

The light source device 114 is different from the light source device 110 of the First Embodiment and the light source device 112 of the Second Embodiment in that the optical sheet simultaneously functions as the spacers 122 described in the First and Second Embodiments. A specific structure is shown in FIG. 16A. In FIG. 16A, the light source substrate 140 is illustrated so as to be located over the light-diffusing plate 170 for visibility. Hence, the inorganic light-emitting elements 142 and the overcoat 144 are located under the light source substrate 140 in FIG. 16A. As demonstrated in FIG. 16A, the light-diffusing plate 170 of the light source device 114 has a recessed portion 170f. The recessed portion 170f is a region of the upper surface of the light source substrate 140 overlapping the plurality of inorganic light-emitting elements 142 and overlaps the whole of the region 142a. In other words, the light-diffusing plate 170 has a side plate 170g having a closed shape in a plane parallel to the upper surface of the light source substrate 140. A region 170h surrounded by the side plate 170g functions as a bottom plate of the recessed portion 170f and overlaps the whole of the region 142a. The bottom plate is integrated with the side plate 170g.

Figure 17A:
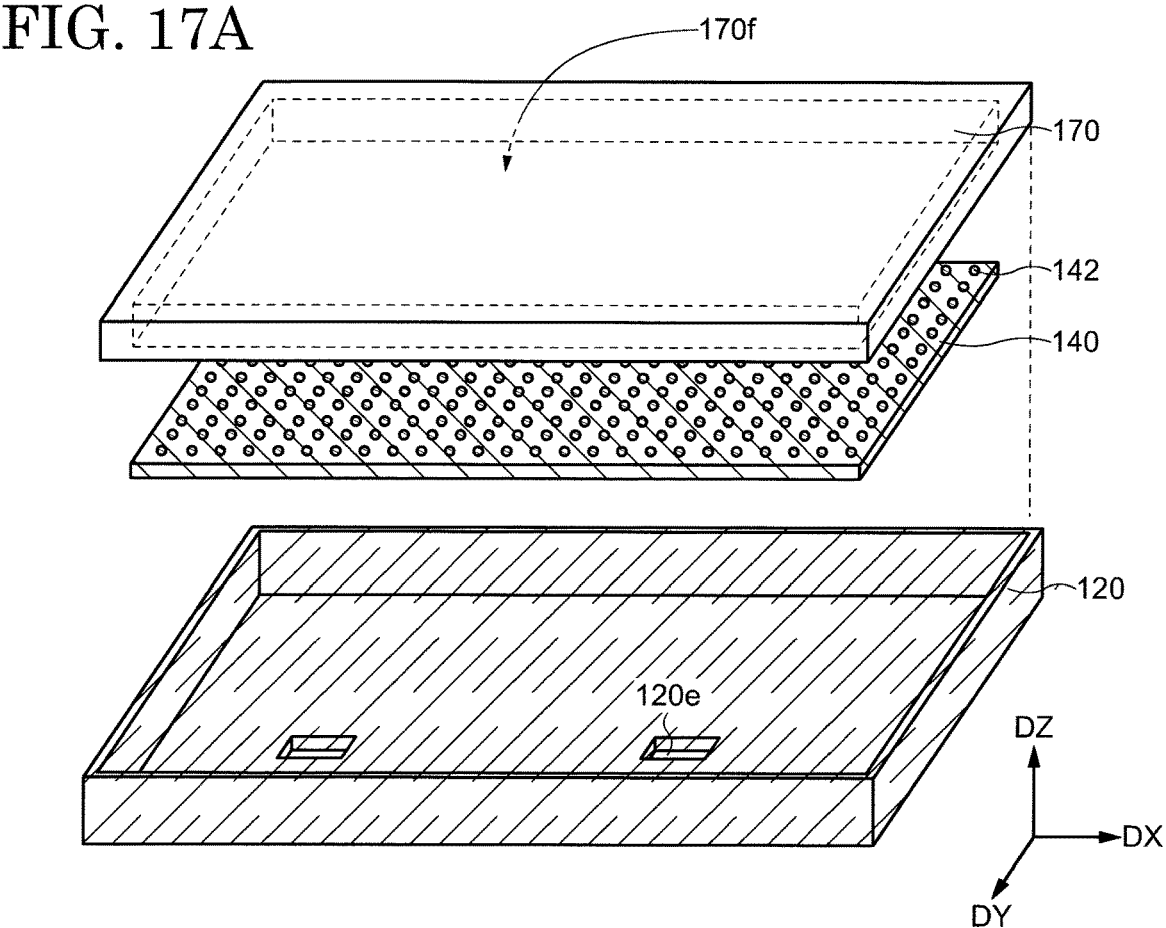
FIG. 17A and FIG. 17B are respectively a schematic developed view and a schematic top view of a light source device according to an embodiment of the present invention.
Figure 17B:
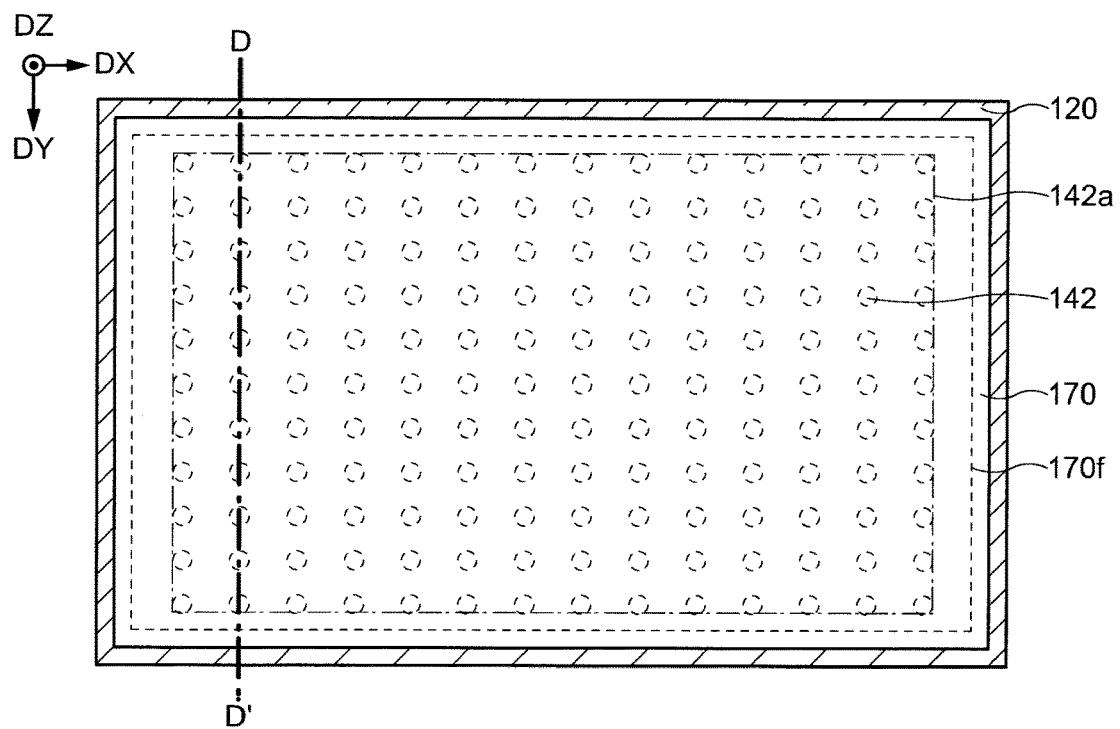
Figure 18A:
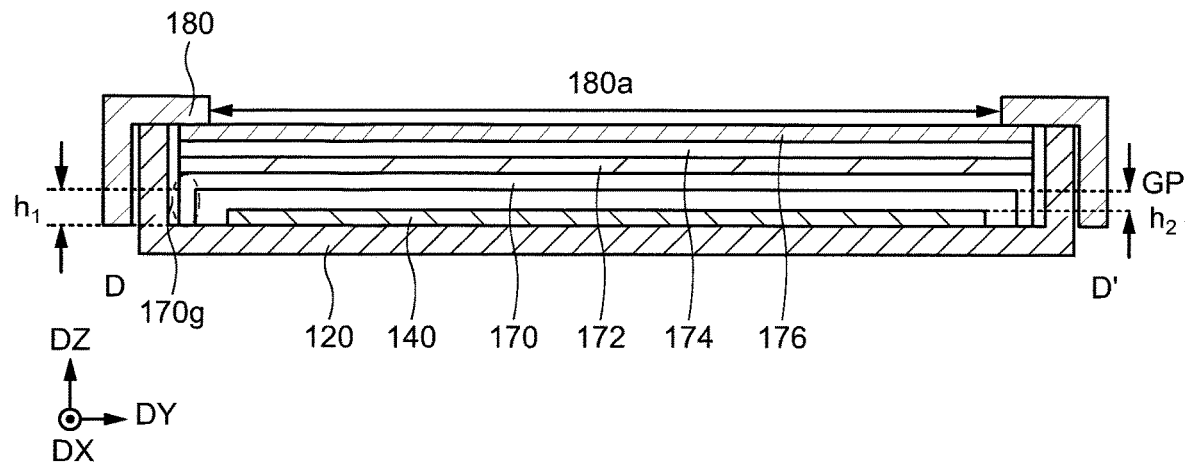
FIG. 18A to FIG. 18C are schematic cross-sectional views of a light source device according to an embodiment of the present invention.

A state where the rear vessel 120, the light source substrate 140 and the light-diffusing plate 170 included in the light source device 114 are developed is shown in FIG. 17A, a schematic top view of these items is shown in FIG. 17B, and a schematic view of a cross section along a chain line D-D' in FIG. 17B is shown in FIG. 18A. As shown in FIG. 17A, FIG. 17B, and FIG. 18A, an opening side of the recessed portion 170f of the light-diffusing plate 170 is located on the rear vessel 120 side. The light source substrate 140 and the inorganic light-emitting elements 142 thereover are positioned between the rear vessel 120 and the light-diffusing plate 170, and the recessed portion 170f covers the region 142a. As depicted in FIG. 18A, the side plate 170g of the light-diffusing plate 170 is in contact with the rear vessel 120, and the bottom plate of the recessed portion 170f is spaced away from the light source substrate 140. Hence, the side plate 170g functions as the spacers 122 of the light source devices 110 and 112.

A difference $h_2$ between a height $h_1$ of the side plate 170g (i.e., a difference between a thickness of the side plate 170g and a thickness of the bottom plate) and a thickness of the light source substrate 140 corresponds to a distance GP between the light source substrate 140 and the optical sheet. The difference $h_2$ is preferred to be equal to or more than 1 mm and equal to or less than 3 mm or equal to or more than 1.5 mm and equal to or less than 2.5 mm, whereas the thickness of the bottom plate of the light diffusing plate 170 is preferred to be equal to or more than 0.5 mm and equal to or less than 2 mm or equal to or more than 0.75 mm and equal to or less than 1.5 mm.

Figure 18B:
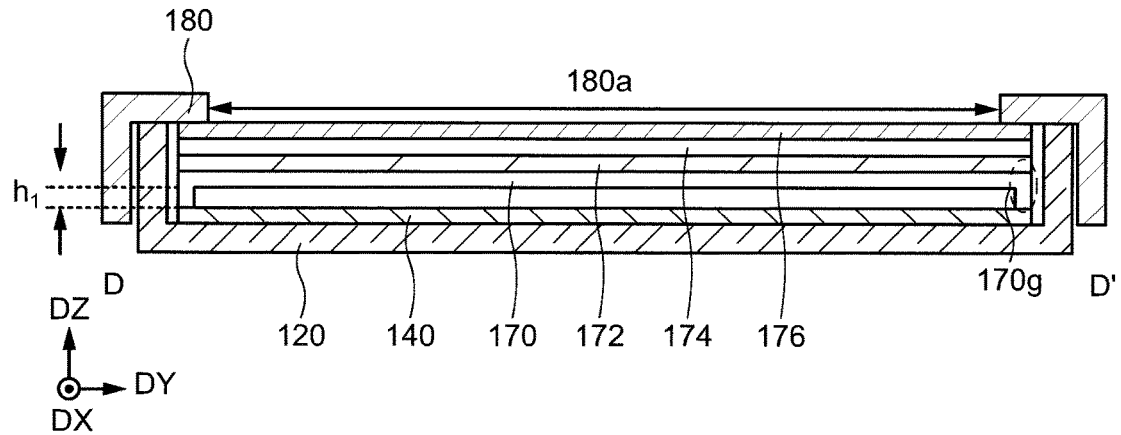
Figure 18C:
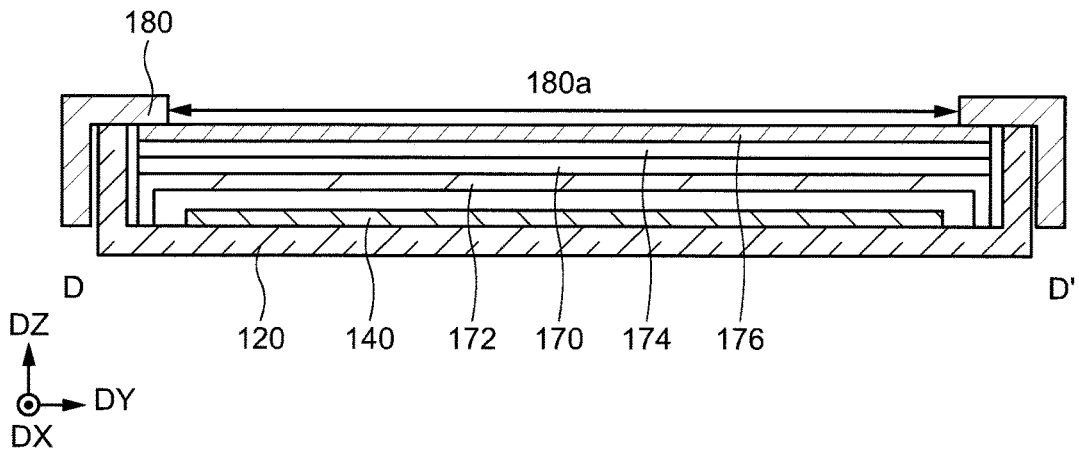

Alternatively, the side plate 170g may be arranged so as to overlap the light source substrate 140 in a plan view as shown in FIG. 18B. In this case, the side plate 170g and the light source substrate 140 or the side plate 170g and the overcoat 144 are in contact with each other, and the bottom plate covers the whole of the region 142a. The height $h_1$ of the side plate 170g and a summation of the thickness of the overcoat 144 and the height $h_1$ in the case where the overcoat 144 is disposed are each adjusted to be equal to or more than 1 mm and equal to or less than 3 mm or equal to or more than 1.5 mm and equal to or less than 2.5 mm. Note that, when the wavelength-converting film 172 is arranged between the light source substrate 140 and the light-diffusing plate 170, a recessed portion may be formed in the wavelength-converting film 172 without forming the recessed portion 170f in the light-diffusing plate 170 (FIG. 18C). In this case, the recessed portion of the wavelength-converting film 172 also covers the whole of the region 142a.

Figure 16B:
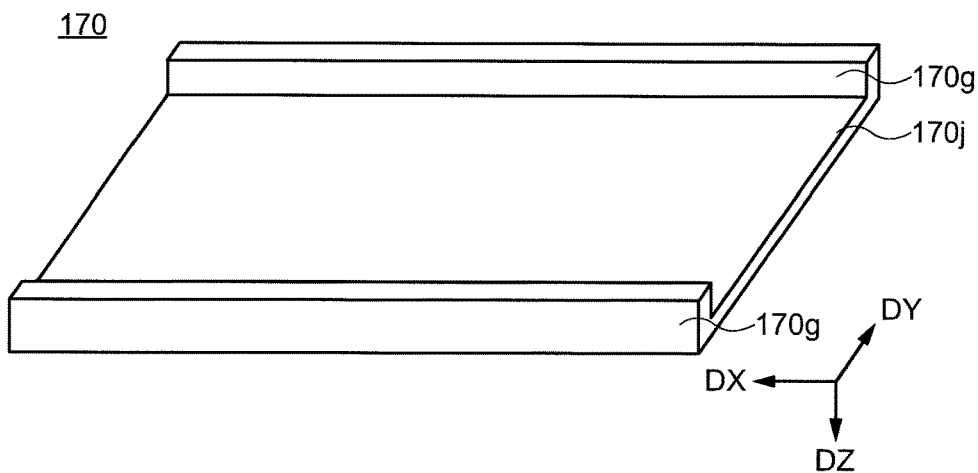
FIG. 16B and FIG. 16C are schematic perspective views of a light-diffusing plate.
Figure 16C:
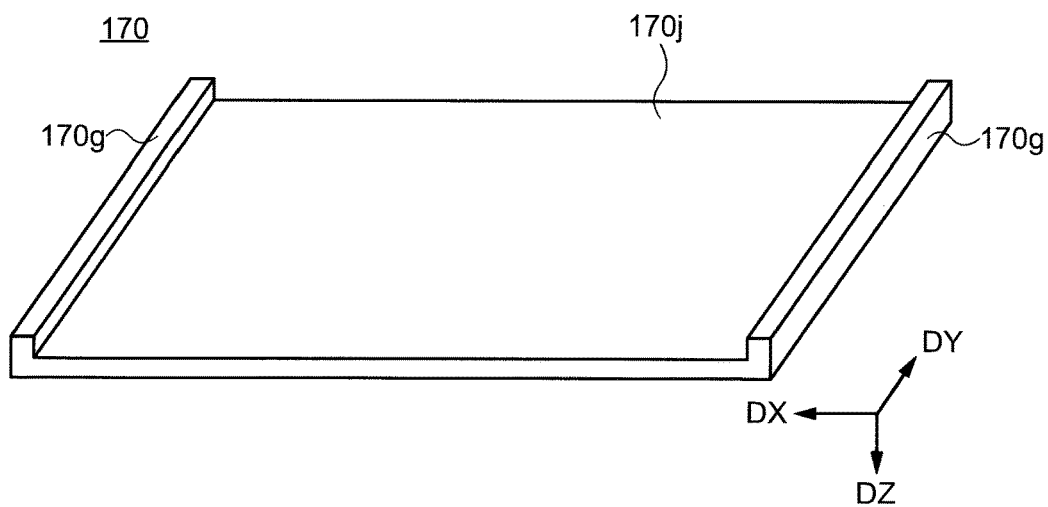

It is not always necessary for the side plate 170g of the light-diffusing plate 170 to have a closed shape in a plan parallel to the upper surface of the light source substrate 140. For example, edge portions selected from the edge portions of the light-diffusing plate 170 and opposing each other may bent toward the direction of the light source substrate 140 as shown in FIG. 16B. The light diffusing plate 170 may have a pair of side plates 170g separated from each other and a flat portion 170j located between the side plates 170g. The pair of side plates 170g may be arranged along the long side of the light-diffusing plate 170, that is, along the first direction DX (FIG. 16B) or may be arranged along the short side, that is, along the second direction DY (FIG. 16C). In the cases shown in FIG. 16B and FIG. 16C, the flat portion 170j also covers the whole of the region 142a. Although not illustrated, the wavelength-converting film 172 may be arranged between the light source substrate 140 and the light-diffusing plate 170, and the wavelength-converting film 172 may have the same structure as the light-diffusing plate 170.

In the light source device 114 demonstrated in this embodiment, the side plate 170g functions as the spacer 122 maintaining the gap between the light source substrate 140 and the optical sheet. Therefore, a portion of the light-diffusing plate 170 mainly contributing to the light diffusion (e.g., the bottom plate and the flat portion 170j) and the light source substrate 140 can be spaced away from each other. Hence, the same effects of the First Embodiment can be achieved.

Note that, although an example is described where the light-diffusing plate 170 or the wavelength-converting film 172 is bent, the present embodiment is not limited thereto. The component of the optical sheet closest to the inorganic light-emitting elements 142 may be bent instead of the light-diffusing plate 170 and the wavelength-converting film 172

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

It is understood that another effect different from that provided by the modes of the aforementioned embodiments is achieved by the present invention if the effect is obvious from the description in the specification or readily conceived by persons ordinarily skilled in the art.

What is claimed is:

1. A light source device comprising:
a housing body;
a light source substrate located over and accommodated in the housing body;
a plurality of inorganic light-emitting elements over the light source substrate;
an overcoat over the plurality of inorganic light-emitting elements and in direct contact with the light source substrate;
an optical sheet located over the plurality of inorganic light-emitting elements and the overcoat, accommodated in the housing body, and spaced away from the light source substrate; and
at least one spacer accommodated in the housing body and in direct contact with a bottom surface of the optical sheet,
wherein a region of an upper surface of the light source substrate overlapping the plurality of inorganic light-emitting elements does not overlap the at least one spacer.

2. The light source device according to claim 1, wherein the at least one spacer surrounds the light source substrate.

3. The light source device according to claim 1, wherein the at least one spacer surrounds the plurality of inorganic light-emitting elements.

4. The light source device according to claim 1,
wherein the at least one spacer overlaps the light source substrate in a plan view.

5. The light source device according to claim 1,
wherein the overcoat covers the plurality of inorganic light-emitting elements, and
the at least one spacer is in direct contact with the overcoat.

6. The light source device according to claim 1,
wherein the at least one spacer is in contact with a side plate of the housing body.

7. The light source device according to claim 1,
wherein the housing body includes a first side plate and a second side plate opposing each other,
the at least one spacer includes a first pair of spacers, and
the first pair of spacers extends along the first side plate and the second side plate, respectively.

8. The light source device according to claim 7,
wherein the housing body further includes a third side plate and a fourth side plate opposing each other,
the at least one spacer further includes a second pair of spacers,
the second pair of spacers extends along the third side plate and the fourth side plate, respectively, and
a direction in which the first pair of spacers extends and a direction in which the second pair of spacers extends perpendicularly intersect each other.

9. The light source device according to claim 1,
wherein the at least one spacer includes at least three spacers.

10. The light source device according to claim 1,
wherein the at least one spacer has a step in contact with the optical sheet.

11. The light source device according to claim 1,
wherein the at least one spacer includes:
 a first supporting layer; and
 a second supporting layer over and in contact with the first supporting layer, and
the first supporting layer and the second supporting layer respectively include a first material and a second material different from each other.

12. The light source device according to claim 1,
wherein the at least one spacer includes a plurality of spacers,
the plurality of spacers each have a lower portion and an upper portion,
the optical sheet has a plurality of recessed portions or a plurality of through holes, and
the upper portions of the plurality of spacers are located in the respective plurality of recessed portions or the plurality of through holes.

13. The light source device according to claim 1,
wherein the housing body includes a first side plate and a second side plate opposing each other,
the at least one spacer includes a pair of spacers,
the pair of spacers extends along the first side plate and the second side plate, respectively,
the optical sheet has a plurality of trenches, and
at least a part of each of the pair of spacers is located in the respective trench.

* * * * *